US006716634B1

(12) United States Patent
Myerson

(10) Patent No.: US 6,716,634 B1
(45) Date of Patent: Apr. 6, 2004

(54) INCREASING IONIZATION EFFICIENCY IN MASS SPECTROMETRY

(75) Inventor: Joel Myerson, Berkeley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 128 days.

(21) Appl. No.: 09/583,791

(22) Filed: May 31, 2000

(51) Int. Cl.[7] .......................... G01N 1/00; G01N 24/00

(52) U.S. Cl. .......................... 436/86; 436/94; 436/173; 436/174

(58) Field of Search .......................... 436/56, 86, 94, 436/173, 174

(56) References Cited

U.S. PATENT DOCUMENTS

| | | | | | |
|---|---|---|---|---|---|
| 5,240,859 | A | | 8/1993 | Aebersold | |
| 5,516,931 | A | | 5/1996 | Giese et al. | |
| 5,607,859 | A | * | 3/1997 | Biemann et al. | 436/173 |
| 5,635,404 | A | * | 6/1997 | Wilson | 436/173 |
| 6,013,785 | A | | 1/2000 | Bruice et al. | |

FOREIGN PATENT DOCUMENTS

| | | |
|---|---|---|
| EP | 0 850 320 | 12/1999 |
| EP | 0 840 804 | 4/2000 |
| WO | WO 96/27681 | 9/1996 |
| WO | WO 97/27325 | 7/1997 |
| WO | WO 97/27327 | 7/1997 |
| WO | WO 97/27331 | 7/1997 |

OTHER PUBLICATIONS

Baranov et al. Fullerene dications and trications as initiators in the gas–phase "ball–and–chain" polymeization of allene and propyne: Observation of a remarkable periodicity in chain growth with allene. J. Am Chem. Soc. vol. 119:2040–2049, 1997.*

Gut et al. Analysis of DNA by 'charge tagging' and matrix-assisted laser desorption/ionization mass spectrometry. Rapid Commun Mass Spec. vol. 11:4–50, 1997.*

Gut et al. P procedure for selective DNA alkylation and detection by mass spectrometry. Nuc. Acids. Res. vol. 23(8): 1367–1373, 1995.*

Bartlett–Jones et al. Peptide ladder sequencing by mass spectrometry using a novel, volatile degradation reageant. Rapid Commun. Mass Spec. vol. 8:737–742, 1994.*

Vath et al. Microderivitization of peptides by placing a fixed positive charge at the N–terminus to modify high energy collision fragmentation. Int. J. Mass Spectrom. and Ion Processes. vol. 100:287–299, 1991.*

Berlin et al. Anaysis of negatively 'charge–tagged' DNA by matrix–assisted laser deorption/ionization time–of–flight mass spectrometry. Rapid Commun. Mass Spec. vol. 13:1739–1743, 1999.*

Aebers old, et al., "Design, Synthesis, and Characterization of a Protein Sequencing Reagent Yielding Amino Acid Derivatives With Enhanced Detectability by Mass Spectrometry" Protein Science, 1:494–503, 1992.

Bartlett–Jones, et al., "Peptide Ladder Sequencing by Mass Spectrometry Using a Novel, Volatile Degradation Reagent", Rapid Commun. Mass. Spectrom., 8:737–742, 1994.

Gut, et al., "A Procedure for Selective DNA Alkylation and Detection by Mass Spectrometry", Nucleic Acids Res., 23(8): 1367–1373, 1995.

Gut, et al., "Analysis of DNA by "Charge Tagging" and Matrix–Assisted Laser Desorption/Ionization Mass Spectrometry", Rapid Commun. Mass Spectrom. 11:43–50, 1997.

Sund, et al., "Synthesis of C–Branched Spermine Tethered Oligo–DNA and the Thermal Stability of the Duplexes and Triplexes" Tetrahedron 52(37): 12275–12290, 1996.

* cited by examiner

*Primary Examiner*—James Ketter

(57) ABSTRACT

A system for the analysis of polyionic molecules by mass spectrometry is provided. The polyionic molecule is attached to a charged tag which neutralizes some of the charge on the polyionic analyte. The formed adduct with a reduced net charge is then analyzed by mass spectrometry, and the determined molecular weight of the adduct can be used to calculate the molecular weight of the analyte. Mass spectrometric analyses of polynucleotides and proteins are particularly amenable to this method.

20 Claims, 18 Drawing Sheets

AMINO-TAGGED THYMIDINE

| |
|---|
| FIG. 17A |
| FIG. 17B |

NET +2 CHARGE TAG INCORPORATED

INCREASING IONIZATION EFFICIENCY IN MASS SPECTROMETRY

BACKGROUND OF THE INVENTION

Mass spectrometry has been used for many decades in the characterization of small organic molecules. The technique typically involves the ionization of molecules in the sample to form molecular ions by subjecting the sample to an electron beam at a very low pressure ($10^{-5}$ to $10^{-6}$ torr). The molecular ions are then focused and accelerated by an electric field into a magnetic field or quadrapole. The ions are separated in the magnetic field or quadrapole according to the ratio of the mass of the ion m to the charge on the ion z (m/z). After passing through the field, the ions impinge upon a detector which determines the intensity of the ion beam and the m/z ratio, and these data are used to create the mass spectrum of the sample.

With the increasing interest in larger molecules, especially biomolecules such as nucleic acids and proteins, new techniques in the field of mass spectrometry are continually being developed to characterize these molecules. Currently, mass spectrometry of biomolecules is typically done by matrix-assisted laser desorption ionization-time of flight (MALDI-TOF) or electrospray mass spectrometry. However, most large biomolecules such as oligonucleotides are poly-ionic. In electrospray mass spectrometry, the polyionic nature of these molecules results in multiply charged ions which complicate the interpretation of the mass spectrum. In MALDI-TOF mass spectrometry, the ions are mostly singly charged; therefore, during the ionization process all except for one charge on the molecule must be neutralized. The efficiency of the ionization process for polyionic molecules is therefore reduced.

A need exists for techniques in mass spectrometry which increase sensitivity and/or selectivity in the analysis of polyionic molecules. One way to accomplish this is through the use of mass ionization tags. These tags contain functionalities that will increase the effectiveness of the ionization process and/or make the process more selective. Mass ionization tags are typically covalently attached to the molecule which is to be ionized and analyzed by mass spectrometry.

Several groups have devised mass ionization tags with positively charged quaternary ammonium groups. Aebersold et al. have used a quaternary ammonium group to enhance the ionization of N-phenylthiohydantoins (PTH) of amino acids, which are formed during the Edman degradation of proteins or polypeptides (Aebersold et al., *Protein Science* 1:494–503, 1992). The use of the novel Edman-type sequencing reagent 3-(4'(ethylene-N,N,N-trimethyl-amino) phenyl)-2-isothiocyanate results in unusually high ionization efficiencies which suppress chemical noise by selectively enhancing detection of the quaternary amine-containing compounds.

The use of cleavable tags that contain quaternary ammonium groups or other amine groups in order to increase their ionization efficiency has also been described for use in identifying and characterizing biomolecules (Van Ness et al., EP 0850320, Jul. 31, 1997; Van Ness et al., EP 0840804, Jul. 31, 1997; Van Ness et al., EP 0868583, Jul. 31, 1997). Giese et al. have disclosed the use of cleavable electrophore tags (Giese et al., U.S. Pat. No. 5,516,931, May 14, 1996). The incorporation of quaternary ammonium groups in peptides by reaction of amines with quaternary ammonium N-hydroxysuccinimidyl (NHS) alkyl esters and subsequent detection by MALDI-MS has been reported (Bartlett-Jones et al., *Rapid Communications in Mass Spectrometry* 8:737–742, 1994).

Gut et al. have disclosed the use of backbone alkylation of phosphorothioate-containing oligonucleotides, and more specifically the use of quaternary amine tags in association with backbone alkylation in order to increase sensitivity and selectivity (Gut et al., *Rapid Commun. Mass. Spectrom.* 11:43–50, 1997; Gut et al., *Nucleic Acids Res.* 23: 1367–1373, 1995; Gut et al., WO 96/27681, Sep. 12, 1996). In this method, the increased selectivity for the oligonucleotides of interest is presumed to result from (1) these molecules having one pre-made positive charge and no negative charges whereas the other oligonucleotides in the sample are multiply charged, and (2) the matrix-assisted laser desorption ionization-time of flight (MALDI-TOF) mass spectrometric system being less sensitive for multiply charged ions. For example, MALDI-TOF mass spectroscopy has a higher sensitivity for proteins than for oligonucleotides of similar molecular weight. Disadvantages of this method include incomplete alkylation of the backbone or overalkylation of the oligonucleotide with hydroxyl groups of the sugar or amines of the nucleotide bases being alkylated. Varying degrees of alkylation in the sample lead to difficulty in interpreting the mass spectrum due to the different molecular weights of the various alkylated oligonucleotides.

A method has also been reported to improve ionization and reduce fragmentation of polyionic analytes using polyionic reagents that form non-covalent complexes with the analytes (Biemann et al., U.S. Pat. No. 5,607,859, Mar. 4, 1997). These polyionic reagents are of opposite charge to the analyte resulting in complex formation. Under soft ionization conditions, the complex with the analyte and reagent together can be ionized resulting in stabilization of the ion. However, this method results in mass spectral peaks that contain no adducts, one adduct, or multiple adducts thereby complicating interpretation of the mass spectrum. Furthermore these complexes are formed using strongly basic or acidic reagents that rely on extremes of pH to achieve a charge, rather than incorporating permanently charged groups such as quaternary ammonium functionalities.

These techniques described in the prior art rely on two principles. The first is the tendency of certain functionalities within the tag to readily pick up charge, and the second is the use of tags consisting of functional groups that are "pre-charged" and do not undergo formal ionization (i.e., quaternary ammonium groups). An example of a tendency to readily pick up charge is amines with APCI (atmospheric chemical ionization) mass spectrometry, and an example of "pre-charged" tags is quaternary ammonium functionalities with ion evaporation mass spectrometry or MALDI-MS.

Although these processes can be effective, as in the case of oligonucleotide backbone alkylation, the oligonucleotide must be synthesized starting from special modified nucleotides in which one of the oxygens on the phosphate is replaced by a sulfur atom. The process of alkylation itself requires extra steps and manipulation of the sample. Also, this process of alkylation must be finely controlled in order to minimize the occurrence of over-alkylation, which if it occurs can make interpretation of the mass spectrum more difficult.

In summary, previous use of mass ionization tags attempt to achieve a single charge by 1) reacting the charges with alkylating agents, 2) neutralization of the charges through proton transfer with the matrix, 3) using a single readily ionizable or permanently charged functionality, such as a quaternary ammonium group, or 4) noncovalent complexation of a multiply charged polyionic reagent with the polyionic analyte. These methods frequently require modified analytes and extra sample preparation steps. And in the end, they can result in difficulties in mass spectrum interpretation due to low ionization efficiency, fragmentation of the molecular ion, or the formation of multiple adducts. There remains a need for improved methods to increase the ionization efficiency and sensitivity/selectivity of polyionic molecules in mass spectrometry.

SUMMARY OF THE INVENTION

The present invention provides a system for efficient ionization of polyionic analytes, such as but not limited to oligonucleotides and proteins, for mass spectrometry. The invention also provides a system for obtaining selectivity in the analysis of a collection of polyionic analytes. This method is particularly suited for soft ionization techniques such as matrix-assisted laser desorption ionization (MALDI).

In particular, this invention provides a method of controlling the amount of charge on a polyionic analyte molecule by attaching a charged tag of known molecular weight (FIG. 1). The molecular weight of the analyte/tag adduct is then determined by standard mass spectroscopic techniques. The weight of the untagged analyte molecule can then be deduced from the weight of the adduct.

By neutralizing the charges on the original molecule with a tag, the net charge on the tagged analyte molecule can be controlled, resulting in a highly efficient and selective ionization process. One advantage of this invention is that it can efficiently create ions for mass spectrometry containing any desired degree of net charge. Such molecules can then be analyzed by mass spectrometry techniques, in particular matrix-assisted laser desorption ionization time-of-flight mass spectrometry (MALDI-TOF-MS).

The invention also provides compositions comprising a polyionic analyte containing n net charges and a collection of charged tags associated with the analyte so that the analyte/tag(s) adduct has a net charge of n-y, where y is the net charge on the tag(s); preferably, the net charge on the analyte/tag(s) adduct is −1, 0, or +1.

Advantages of the current invention include the use of unmodified analyte molecules in the tagging process, high ionization efficiencies, less fragmentation of the molecular ions, and no formation of multiple adducts.

DEFINITIONS

Figure 1:
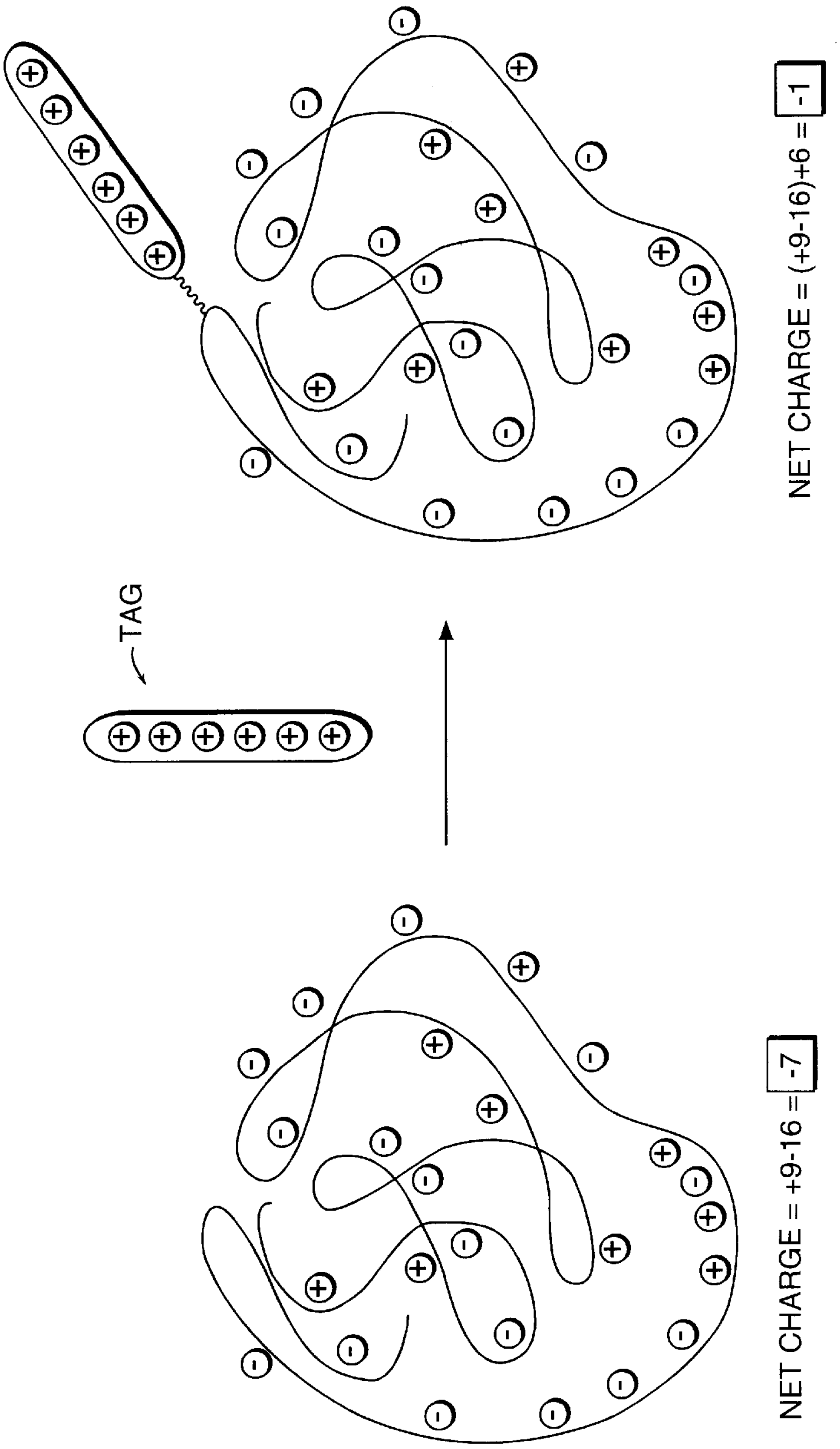
FIG. 1 shows the preparation of a polyionic analyte molecule using charged tags for mass spectrometric analysis.

Adduct refers to the combination of the analyte and the tag, or in other words, the analyte attached through some means to at least one tag. The analyte and tag may be attached through a covalent linkage or through a non-covalent linkage. In the present invention, the adduct is the molecule which is analyzed by mass spectrometry in the end; therefore, the molecular weight of the adduct is generally determined experimentally, and the molecular weight of the analyte can then be calculated from the experimental value.

Analyte refers to a polyionic chemical compound whose molecular weight is to be determined by mass spectrometry. In the present invention, almost any polyionic compound in the art of chemistry or biology could be the analyte. Examples of analytes include polynucleotides, oligonucleotides, proteins, polypeptides, organic molecules, organometallic molecules, polymers, etc.

Polyionic refers to the analyte having a net charge of greater than positive one or less than negative one. The net charge on the analyte may be negative or positive. The polyionic analyte may contain both positively and negatively charged groups in order to yield a net charge of greater than one. The polyionic nature of the analyte may depend on pH or other conditions, or it may be permanent.

Tag refers to a chemical compound which can be attached to the analyte for the purpose of changing the charge on the analyte. The tag has a net charge of one or greater prior to or during mass spectroscopic analysis, but it may not be charged on attachment to the analyte. The tag may be positively or negatively charged. The tag may consist of functionalities with multiple charges such as phosphate groups. The tag may consist of both positively and negatively charged groups. Tag may be attached to the analyte through covalent or non-covalent means.

Polynucleotide or oligonucleotide refers to a polymer of nucleotides. The polymer may include natural nucleotides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyladenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified or natural sugars (e.g., dideoxyribose, 2'-fluororibose, ribose, 2'-deoxyribose, arabinose, and hexose), modified phosphate groups (e.g., phosphorothioates, methylphosphonates, methylphosphate, and 5'-N-phosphoramidite linkages), or chain terminators (e.g., dideoxyribose, 3'-azidodeoxyribose).

Protein orpolypeptide refers to a polymer of amino acids. The polymer may include natural or unnatural amino acids. The protein or polypeptide may have been synthesized chemically in vitro or in vivo via natural or recombinant means. The protein or polypeptide may have post-translational modifications or may have been modified chemically to include phosphorylation, glycosylation, famesylation, etc.

BRIEF DESCRIPTION OF CERTAIN PREFERRED EMBODIMENTS OF THE INVENTION

As mentioned above, the present invention provides a system for analyzing polyionic molecules by attaching tags that neutralize all or part of the charges present on the untagged molecule (FIG. 1). The resulting adducts can be analyzed by any of a variety of mass spectrometry techniques with greater sensitivity and selectivity than that for the parent compound alone.

Polyionic Analyte

As described above, the analysis of polyionic molecules by mass spectrometry for the determination of molecular weight or fragmentation pattern is particularly difficult due to the low efficiency of the ionization process. To make this process more efficient, the method of attaching a charged tag which neutralizes some of the charge on the polyionic analyte has been developed. The less highly charged analyte/tag adduct is then analyzed by mass spectrometry with greater sensitivity.

Almost any chemical compound bearing more than one charge is amenable to this technique. Examples may include polyionic polynucleotides, polyionic polypeptides, polyionic proteins, polyionic polymers, polyionic organometallic compounds, and polyionic organic compounds. The analyte may contain permanently charged groups such as quaternary ammonium groups, pH-dependent groups such as primary amines, or a combination of both. The analyte may contain negatively charged groups or positively charged groups, or a combination of negatively and positively charged groups. The analyte may also contain functional groups which are multiply charged such as metal ions, phosphate groups, and sulfate groups.

Figure 2:
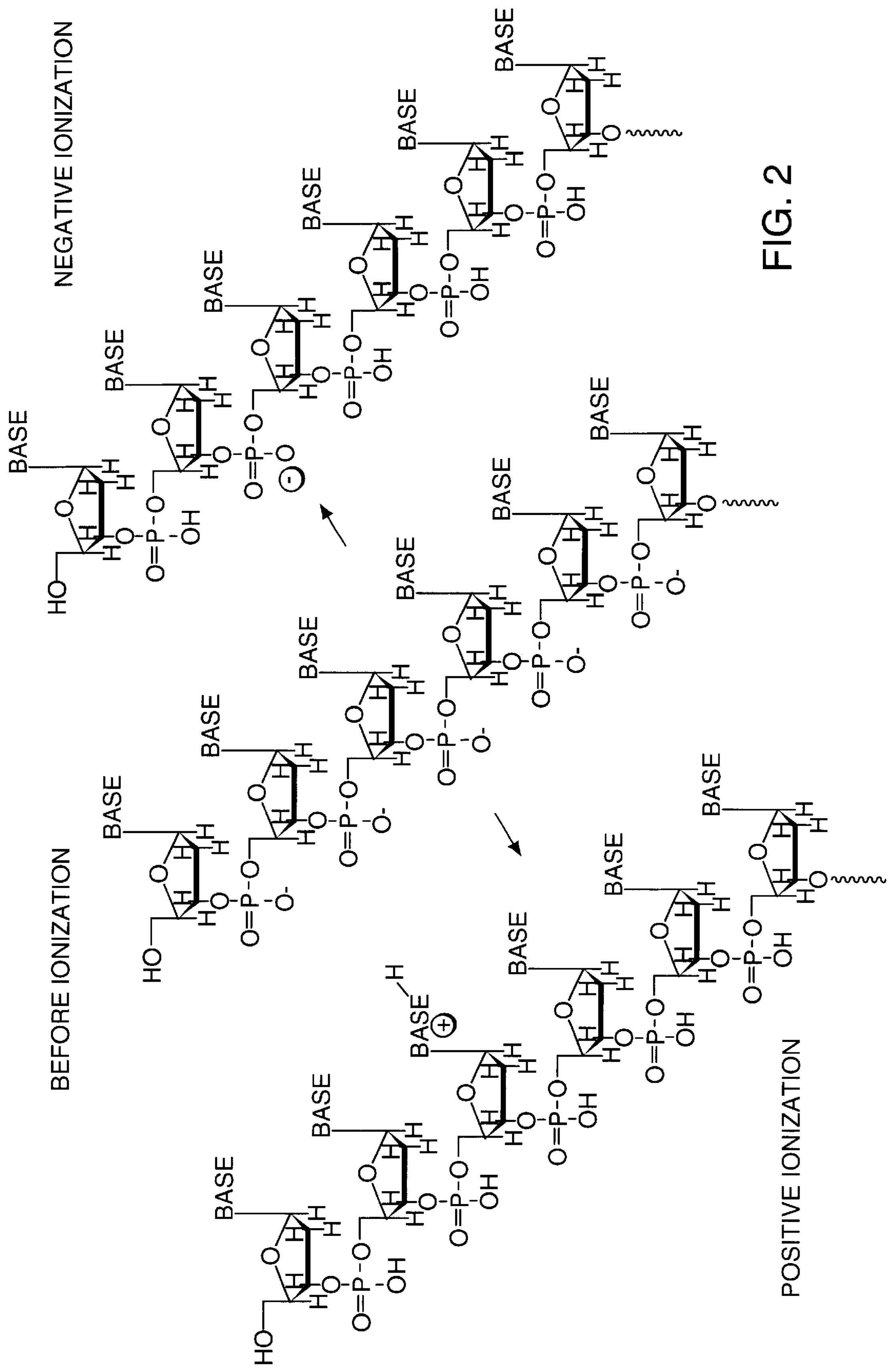
FIG. 2 depicts the negative and positive ionization of an oligonucleotide without the use of tags.

In a preferred embodiment, the polyionic molecule to be analyzed by mass spectrometry is an oligonucleotide. An oligonucleotide n residues long which is not phosphorylated at either end contains a phosphate backbone that has n−1 negative charges at neutral pH. The normal MALDI process requires the use of a matrix, such as 3-hydroxypicolinic acid, that serves both to bring the oligonucleotide into the gas phase and to ionize the molecule. Without attaching a tag, the ionization process in this case involves protonation of all of the charges except one for negative ionization, or all of the charges plus one additional site for positive ionization (FIG. 2). Such an ionization procedure is not very efficient, and usually results in only a small percentage of the analyte molecules being detected in the mass analyzer (e.g., low sensitivity).

Figure 3:
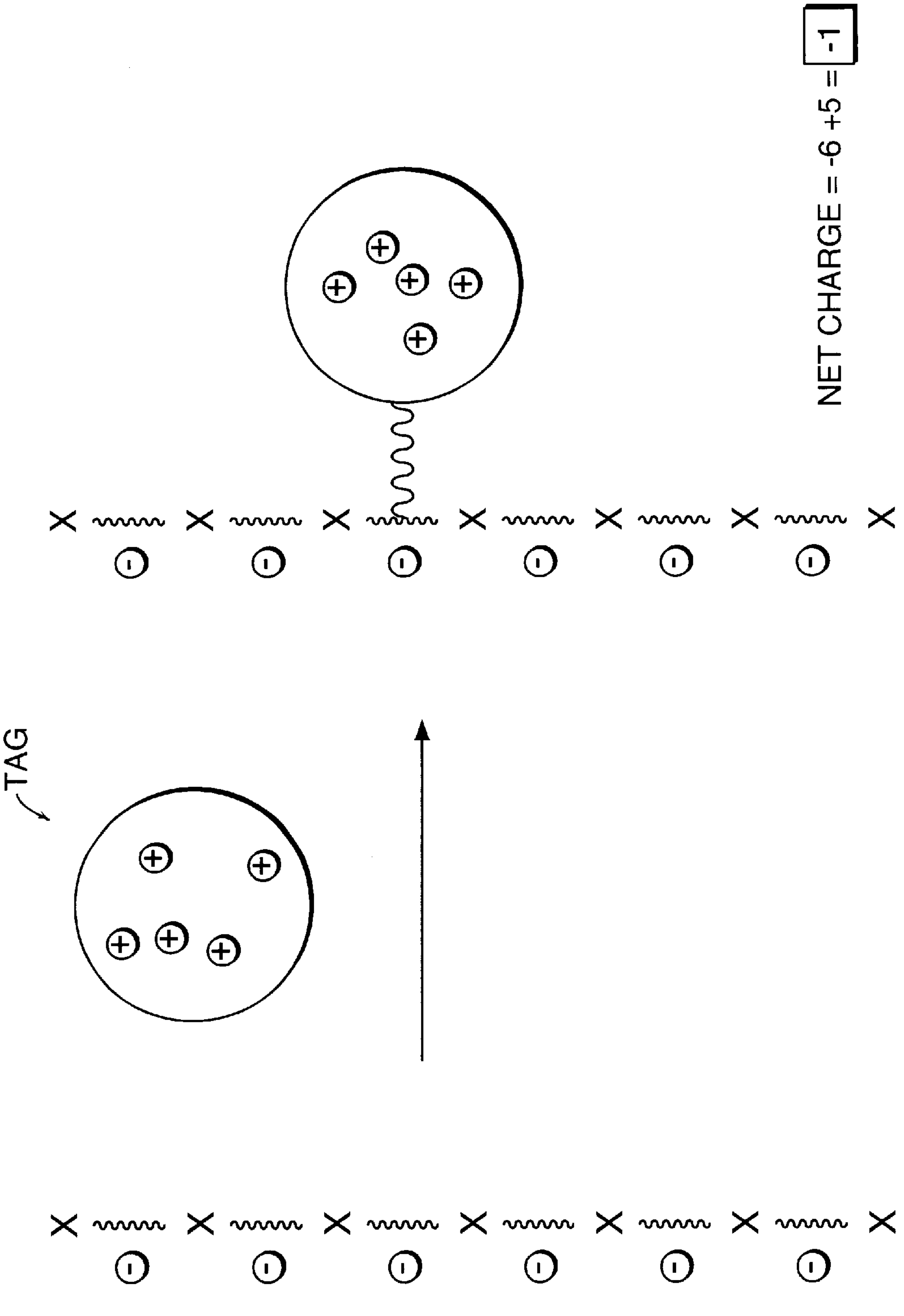
FIG. 3 shows the attachment of a tag having five positive charges to a heptaner thereby neutralizing all but one negative charge.

By attaching a tag containing n−2 positive charges to an oligo-n-mer, a molecule is created that contains a net charge of −1 (see, for example, FIG. 3, which illustrates this principle for an oligo-heptamer). The tag may consist of functionalities that neutralize the phosphate backbone by virtue of being charged at the pH of interest or under the ionization conditions of the mass spectrometry technique being used, or more preferably, may contain permanent positive charges such as quaternary ammonium groups. Other examples of groups with a permanent positive charge include sulphonium and phosphonium ions. Such a tagged molecule with a net charge of −1 will readily form singly charged ions in the gas phase, even in the presence of MALDI matrices that are not sources of protons, resulting in a higher proportion of analyte molecules being detected.

In another preferred embodiment of the invention, the polyionic analyte is a protein. Many of the 20 natural amino acids such as glutamate, aspartate, arginine, lysine, and histidine are charged at neutral pH. Therefore, most proteins are charged at neutral pH with some combination of negative and positive charges. As with the case of polynucleotides, for maximum ionization efficiency a charge of −1 in negative ionization mode or +1 in positive ionization mode is frequently desired. By attaching a tag of known charge, the charge on the protein can be decreased allowing for greater ionization efficiency, and therefore, more ions of lower net charge will be detected by the mass analyzer.

Tags

The tags used in the present invention can be almost any chemical compound with a known or determinable molecular weight and charge. The tags may have functional groups with positive or negative charges, or a combination of both. The charged groups on the tag may be permanently charged, or the charge may depend on pH or other conditions. Examples of permanently charged groups include, but are not limited to, quaternary ammonium groups, metal ions, oxonium ions, phosphonium ions, and sulfonium ions. Examples of pH-dependent groups and functionalities which facilitate the carrying of a charge include, but are not limited to, carboxylic acids, phosphates, phosphonates, phenolic hydroxyls, tetrazoles, sulfonyl ureas, perfluoro alcohols, sulfates, sulfonates, sulfinic acids, primary amines, secondary amines, tertiary amines, anilines, etc. Preferred tags also have a coupling group to allow for attaching it to the analyte. Many such activated coupling groups are known in the art.

In a preferred embodiment, the tag is a poly(lysine) oligomer with its primary amines converted to positively charged quaternary ammonium groups. This can be effected by reacting the poly(lysine) oligomer with an alkylating agent such as methyl iodide or dimethyl sulfate, or by attaching positively charged moieties through an amide bond, for example, by reacting the primary amines with the NHS ester of 3-carboxypropyltrimethylammonium chloride. The carboxy terminus of the tag is activated with N-hydroxysuccinimide for coupling to the analyte. The number of lysine residues making up the tag will depend on the number of charged groups needed.

In another preferred embodiment, the tag is spermine, norspermine, spermidine, norspermidine, homospermidine, ethylenimine oligomers, or some other poly-amine which has been exhaustively alkylated to create positively charged quaternary ammonium groups. In another embodiment, the tag comprises spiro-amine groups. In another embodiment, the tag is based on an ionene structure. In another embodiment, the tag is a peptide containing lysine residues and/or derivatives of lysine (e.g., N-trimethyl lysine) interspersed among other residues such as Lys-Ala-Lys-Ala-(SEQ ID NO:1) . . . , Lys-Gly-Gly-Gly-Lys-Gly-Gly-Gly-Lys-(SEQ ID NO:2) . . . , and Lys-Ala-Lys-Ala-Lys-Leu-Lys-Val-Lys-(SEQ ID NO:3) . . . . In this preferred embodiment, the positively charged quaternary ammonium groups on the alkylated peptide are separated from each other.

In another preferred embodiment, the tag is prepared via a Menschutkin reaction.

In yet another preferred embodiment, the tag is not charged at the time that it is coupled to the analyte but is subsequently modified to form charged groups. In some embodiments, the groups to be functionalized are protected during the coupling step. After coupling, the groups are deprotected using standard deprotection conditions for the protecting groups used, and the deprotected groups are then modified, if necessary, to create the charged groups.

Figure 4:
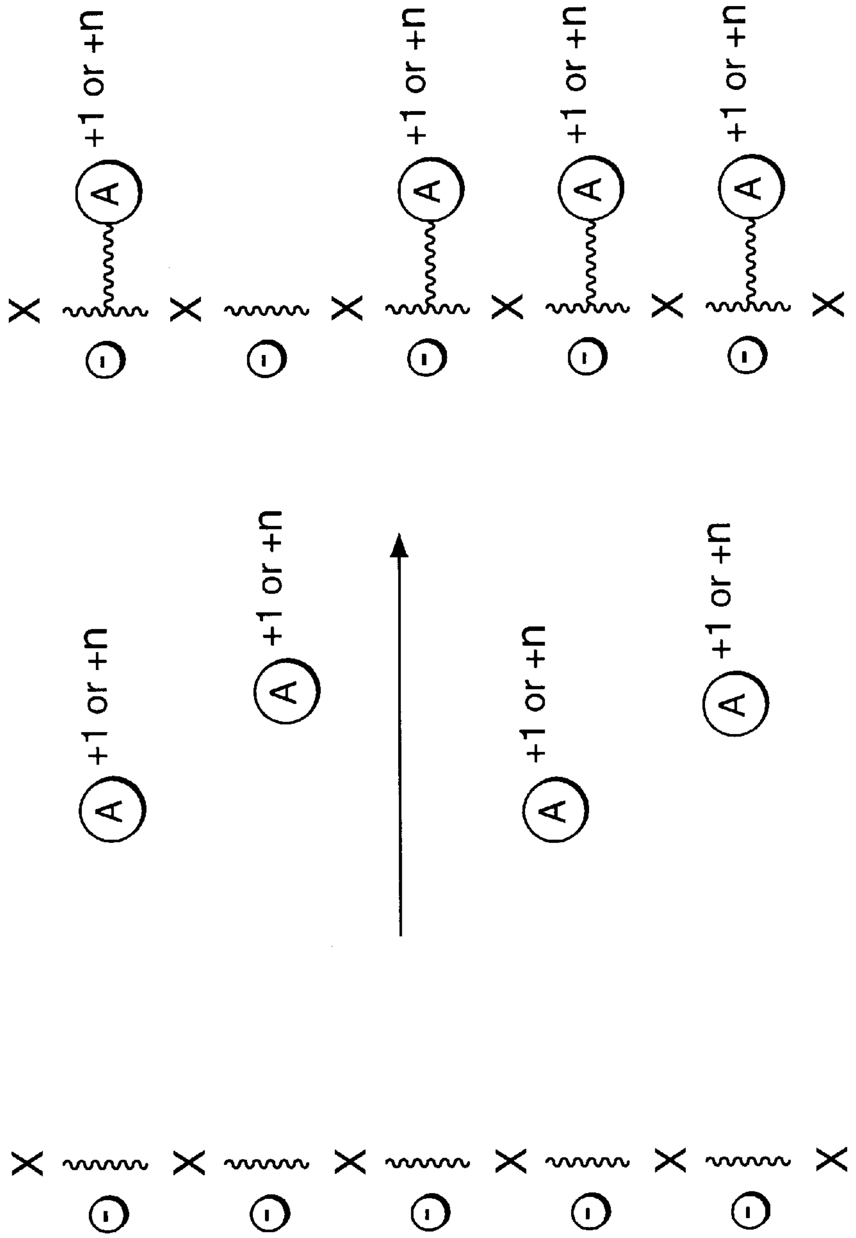
FIG. 4 depicts how more than one tag can be attached to an analyte in order to neutralize its charge. Tags may have one charge or more than one charge.
Figure 5:
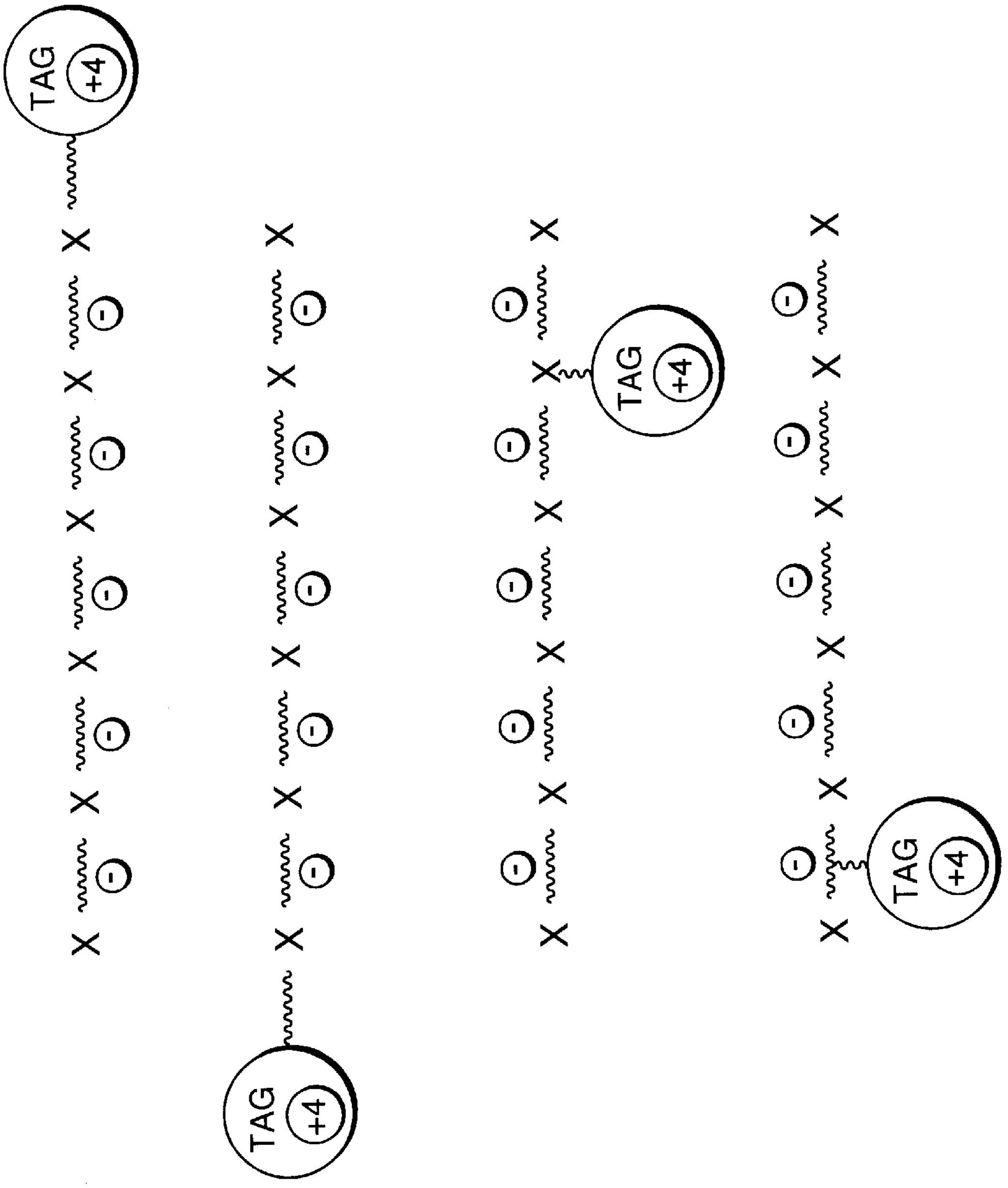
FIG. 5 shows the various places (i.e., ends, backbone, monomer) where tags can be attached to a molecule.

In an alternative preferred embodiment, more than one tag is attached to an analyte molecule in order to change the net charge the desired amount (FIG. 4). Each tag may be singly charged or multiply charged. Whether one tag or multiple tags are attached to the molecule, each tag can be placed anywhere on the molecule including the ends, the middle, the backbone, and the monomers. For an oligonucleotide, the possible attachment sites include the 3'-end, the 5'-end, the phosphate backbone, the nitrogen bases, and the sugar moieties (FIG. 5).

Figure 6:
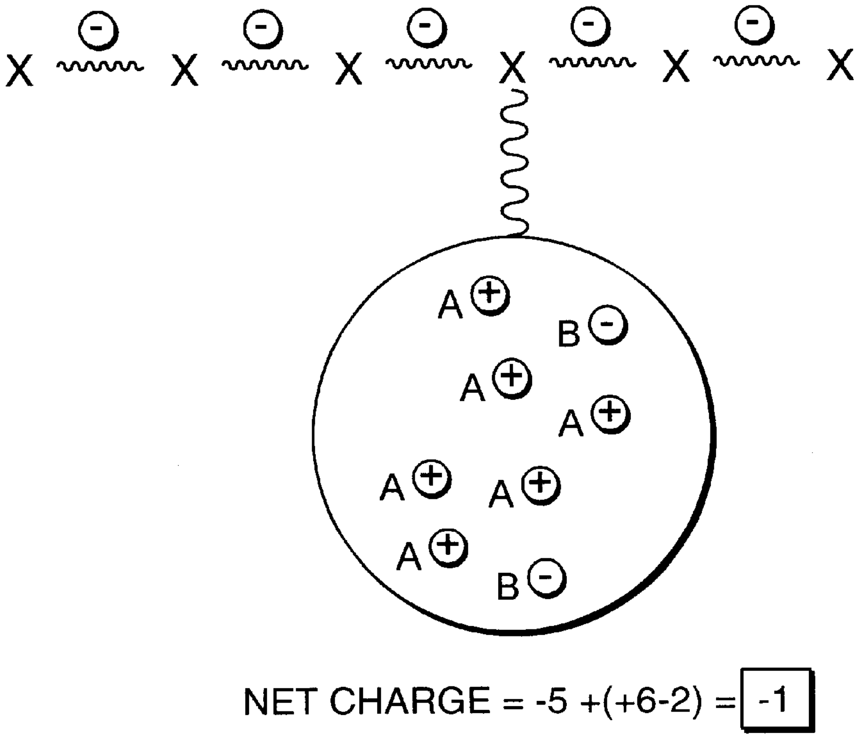
FIG. 6 shows how a tag possessing both positive and negative charges can be used to achieve the desired net charge.

In yet another embodiment of the invention, a multiplicity of positive and negative charges are on the tag so that when the tag is attached to the analyte the desired net charge is achieved (FIG. 6).

In another preferred embodiment, the tag is a polynucleotide analog wherein the phosphate linkages have been replaced with positively charged guanidyl linkages. Tags of this nature may be synthesized by the methods developed by Bruice et al. described in U.S. Pat. No. 6,013,785.

Analyte/Tag Adduct

The net charge on the analyte after attachment of the tag may be either negative or positive. A negatively charged species would be analyzed by the mass spectrometer in negative mode, and a positively charged species would be analyzed in positive mode. For example, analysis can be performed in the positive ionization mode by using a tag that contains a sufficient number of charges such that the tagged analyte has a net positive charge.

Figure 7:
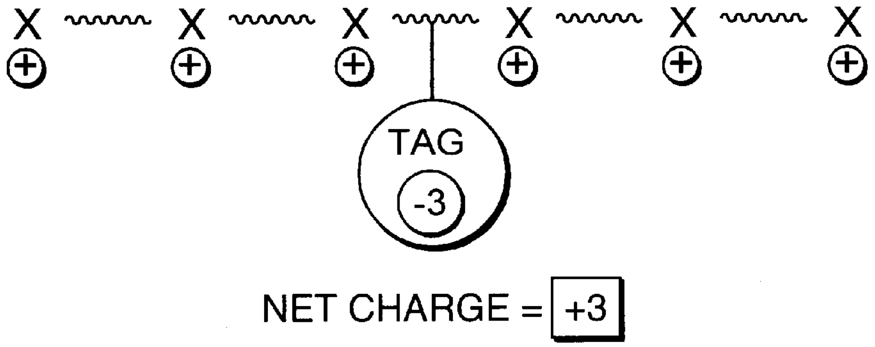
FIG. 7 is a tag attached to an analyte resulting in a net charge of +3.

In another preferred embodiment, the net charge of the analyte/tag adduct is something other than +1 or −1. As will be appreciated by those of ordinary skill in the art, an alternative net charge may be desired if a lower m/z ratio is needed. For example, if a net charge of +3 was desired on an analyte molecule with a charge of +6, a tag with three negative charges could be attached to the molecule (FIG. 7).

Figure 8:
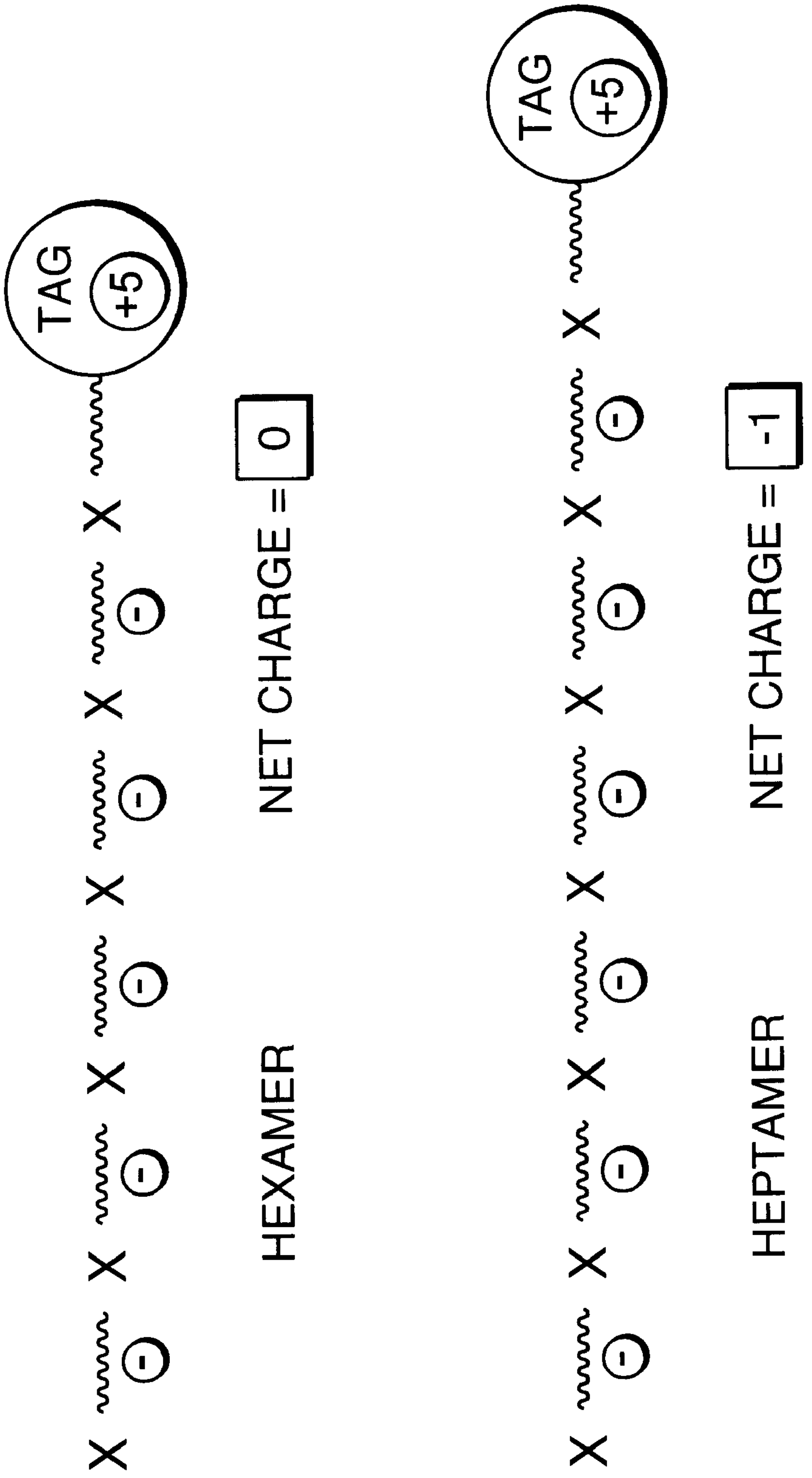
FIG. 8 shows how a tag can be used to selectively analyze oligonucleotides of a particular size.

Another preferred embodiment employs an analyte/tag adduct with no net charge. This is particularly useful if one, for example, desires to observe only oligonucleotide products that have been extended. To give but one example, a single base extension of a hexamer with five negative charges to a heptamer with six negative charges will result in one more negative charge on the backbone. By tagging the starting hexamer with a polyionic tag having five positive charges, the heptamer with a net charge of −1 will be preferentially ionized and analyzed by the mass spectrometer (FIG. 8). Standard mass spectrometric procedures have great difficulty in achieving much selectivity in the ionization efficiencies of hexamers versus heptamers. In other words, an equimolar mixture of the two compounds would yield two signals of approximately the same intensity. Similarly, if one molecule, for example the hexamer, is present in a much greater amount than the heptamer, the heptamer may not be visible due to the large amount of hexamer. This effect could be due to the suppression of the heptamer signal, a well-known phenomenon in MALDI-MS, or possible confusion due to the presence of large isotope peaks or insufficient resolution of the mass spectrometer, or actual coincidence of masses (not possible in the example given unless the hexamer had been mass modified).

Figure 9:
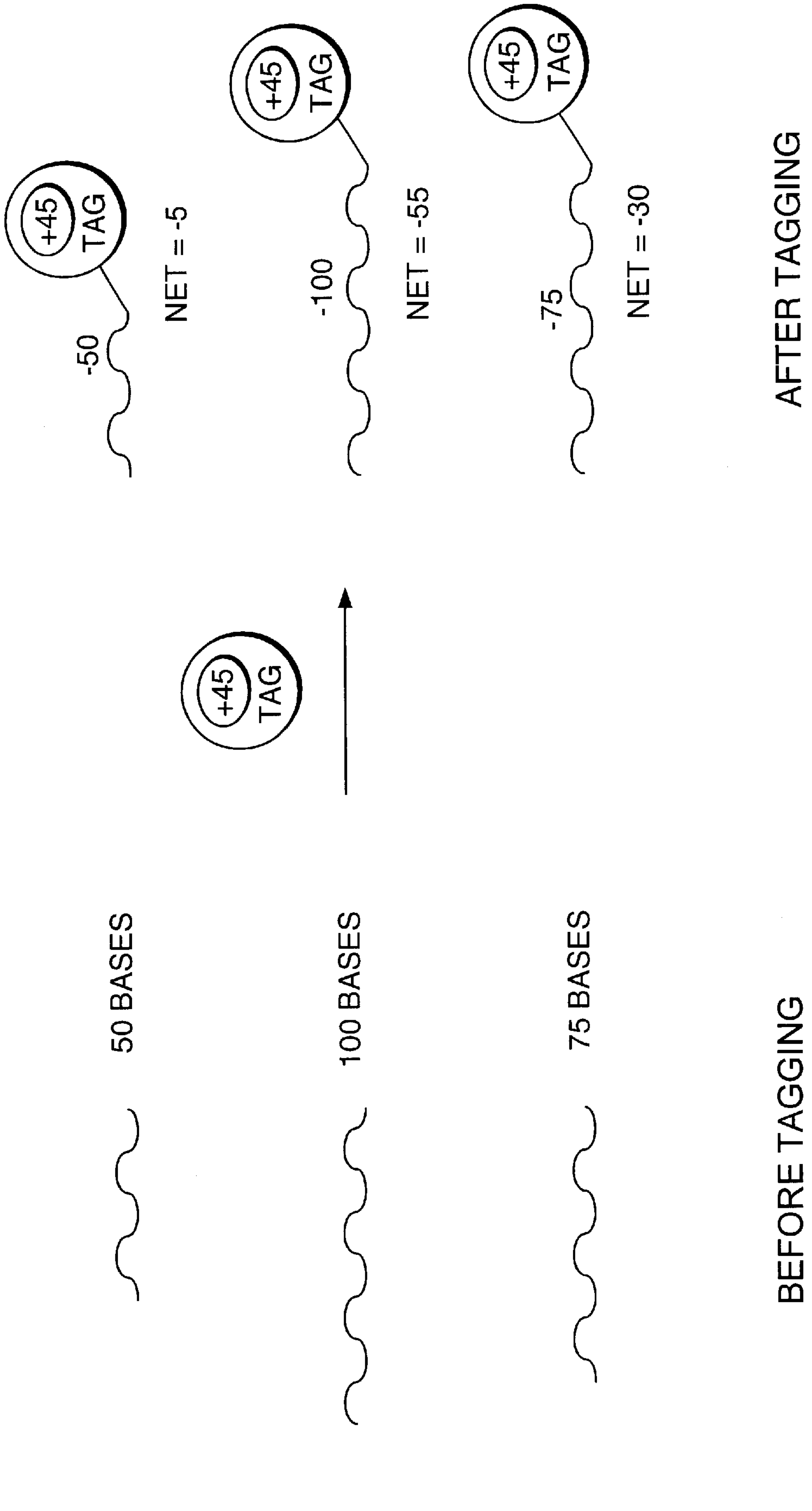
FIG. 9 shows how tags can be used to increase the ionization efficiency of longer oligonucleotides.

In another preferred embodiment, the invention can be used to reduce the number of charges on a molecule even if the exact number of charges on the tags or on the untagged analyte are not precisely known. For example, a mixture of oligonucleotides approximately 50–100 bases long can be tagged with a single tag or mixture of tags of varying charge (FIG. 9). In this case, a MALDI matrix is required that will protonate the remaining negative charges, but an increase in ionization efficiency will be attained because the matrix will have fewer sites to protonate. In effect, as far as the mass spectrometer is concerned, the large oligonucleotide has been turned into a smaller oligonucleotide, which is easier to ionize.

In yet another preferred embodiment, the net charge on the analyte/tag adduct is reduced, when compared to the analyte alone, by at least 50%, 75%, 90%, 95%, or 99%. Ionization of the analyte/tag adduct is then more efficient in the mass spectrometer.

Attachment of Tag to Analyte

In this invention, the tag must be attached by some means to the polyionic analyte molecule before analysis by mass spectrometry. The means of attachment must withstand the experimental conditions of the mass spectroscopy technique chosen to analyze the adduct. In a preferred embodiment, this attachment is achieved using a covalent bond. As will be appreciated by those of ordinary skill in the art, many covalent bond-forming reactions could be used in attaching the tag to the polyionic molecule. Examples of covalent bond-forming reactions include, but are not limited to, alkylations, acylations, phosphorylations, sulfonylation, condensations, silylations, and disulfide formation. In a particularly preferred embodiment, the attachment is accomplished by the formation of an amide bond by coupling an activated ester to a reactive amine.

In another embodiment, the attachment is achieved using a cross-linking reagent with at least two reactive groups for coupling. Both heterobifunctional and homobifunctional reagents could be used. Heterobifunctional reagents are particularly preferred in that greater control in linking a precise number of tags to each polyionic molecule could be achieved.

In another preferred embodiment, this attachment is achieved using a strong non-covalent interaction such as Coulombic attractions, hydrophobic interactions, hydrogen bonding, dipole-dipole interactions, etc., including a combination of these. Any attachment of a non-covalent nature must be strong enough to withstand the conditions of mass spectroscopy chosen to analyze the adduct. In a particularly preferred embodiment, the tag which is to be attached to the analyte through non-covalent interactions is permanently charged using groups such as positively charged quaternary ammonium groups.

Analysis by Mass Spectrometry

Analysis of the adduct by mass spectrometry is accomplished using any of the various ionization techniques combined with any of the various molecular ion detection techniques known in the art. In a preferred embodiment, the molecular weight of the adduct is determined experimentally by mass spectrometry, and then the molecular weight of the polyionic molecule is calculated based on the known molecular weight of the attached tag(s). A particularly preferred mass spectrometry technique is matrix-assisted laser desorption ionization (MALDI) time-of-flight (TOF) MS.

These and other aspects of the present invention will be further appreciated upon consideration of the following Examples, which are intended to illustrate certain particular embodiments of the invention but are not intended to limit its scope, as defined by the claims.

EXAMPLES

Example 1

Attaching a Pre-charged Tag to the Analyte

Figure 10:
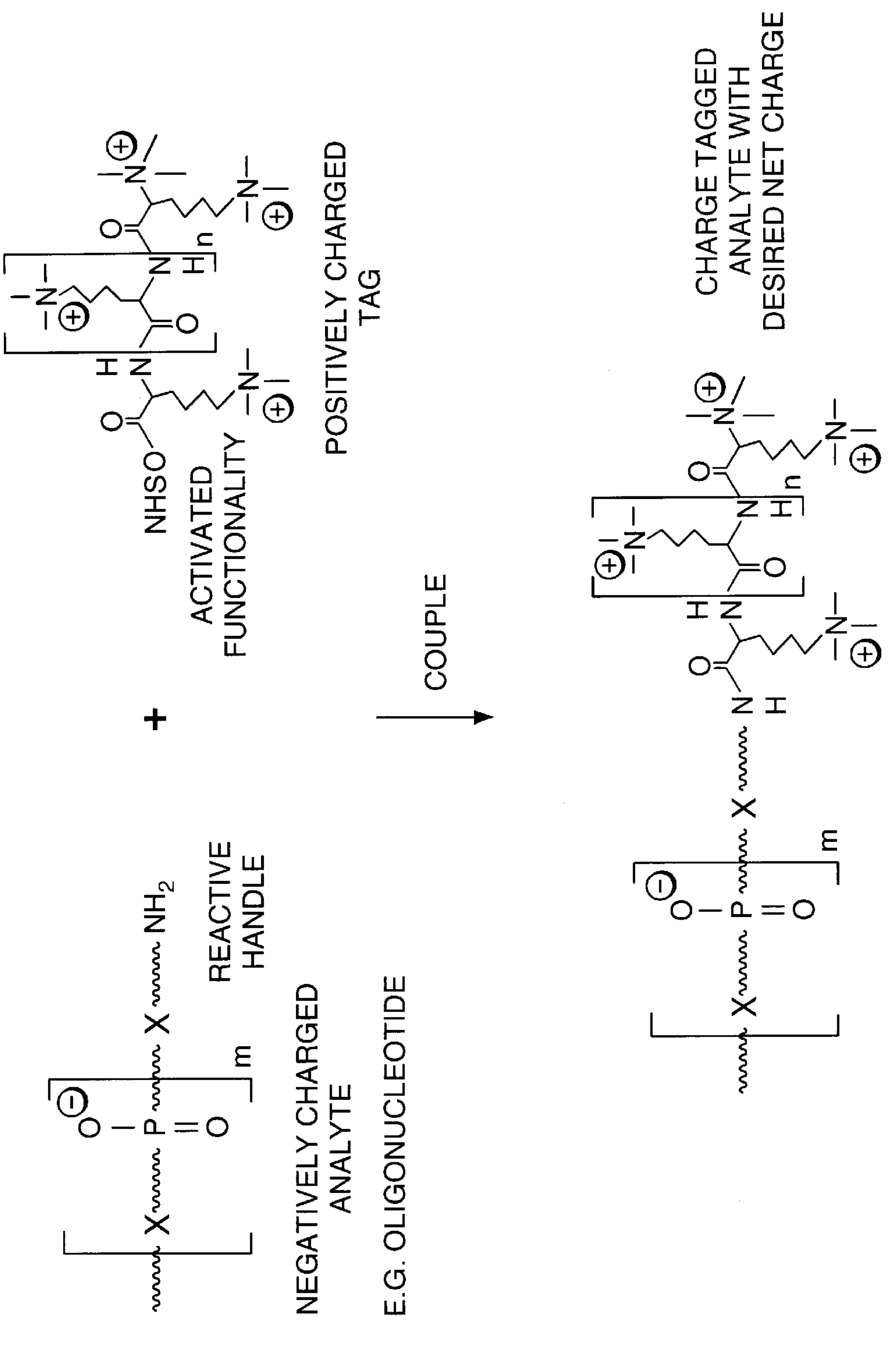
FIG. 10 shows the coupling of a negatively charged analyte with a positively charged tag. The analyte has a reactive amine handle whereas the tag contains an activated ester for coupling.

The polyionic molecule to be analyzed by mass spectrometry is attached to a tag already bearing charged groups in order to neutralize all but one charge on the analyte. Shown in FIG. 10 is an oligonucleotide with a reactive amine handle being coupled to a tag having an N-hydroxysuccinimide (NHS)-activated ester for coupling.

The coupling of the analyte to the tag can be accomplished using any of the large number of covalent bond-forming reactions known in the art. These reactions include alkylations, acylation, phosphorylation, sulfonylation, condensation, silylation, and disulfide formation.

Of particular interest for attaching a tag to a polynucleotide is the formation of an amide bond. Primary amine handles can easily be introduced into the polynucleotide during synthesis using modified phosphoramidites, and an amine-reactive functional group can be introduced into the tag. Examples of amine-reactive functional groups include activated carboxylic esters, isocyanates, isothiocyanates, sulfonyl halides, and dichlorothiazenes. Activated esters show good reactivity with aliphatic amines, and the amide products are very stable. Examples of activated esters include N-hydroxysuccinimide (NHS) esters, pentafluorophenyl esters, tetrafluorophenyl esters, and p-nitrophenyl esters. Activated esters are also useful because they can be synthesized from almost any molecule with a carboxylic acid. Methods to make active esters are listed in Bodansky (*Principles of Peptide Chemistry* (2nd ed.), Springer-Verlag, London, 1993). Other possible activated functionalities on the tag include activated amides, activated carboxylic acids, acyl chlorides, anhydrides, alkyl halides, carbonyls, α, β-unsaturated carbonyls, etc.

In another preferred embodiment of the invention, a cross-linking reagent would serve to link the analyte molecule to the tag. Examples of possible cross-linking reagents include homobifunctional amine-reactive cross-linking reagents (i.e. homobifunctional imidoesters and N-hydroxysuccinimidyl (NHS) esters), and heterobifunctional cross-linking reagents possessing two or more different reactive groups. The use of a heterobifunctional reagent with two of more different reactive groups would allow for sequential reactions and greater control in linking a precise number of tags to each molecule of analyte. The imidoesters react rapidly with amines at alkaline pH. NHS-esters give stable products when reacted with primary and secondary amines. Maleimides, alkyl and aryl halides, alpha-haloacyls, and pyridyl disulfides are thiol reactive. Maleimides are specific for thiol groups in the pH range of 6.5 to 7.5, and at alkaline pH, they can become reactive to amines. A reactive handle such as an amine, a hydroxyl group, or thiol is introduced into both the tag and analyte molecule. The tag, analyte, and linker would be reacted together to link one tag to each analyte molecule and minimize homo-coupling of the tag molecules and analyte molecules.

The tag in this example consists of poly(lysine) oligomer which has been modified by alkylating all the primary amines including the n-terminal amine with methyl iodide or dimethyl sulfate to create positively charged quaternary ammonium groups. The number of lysine residues in the tag depends on the number of negative charges to be neutralized on the original analyte molecule. The carboxy-terminus of the poly(lysine) oligomer is activated with NHS to provide easy coupling of the negatively charged analyte to the positively charged tag. The tag and analyte are reacted together in order to couple one tag onto each analyte molecule (FIG. 10).

Figure 11:
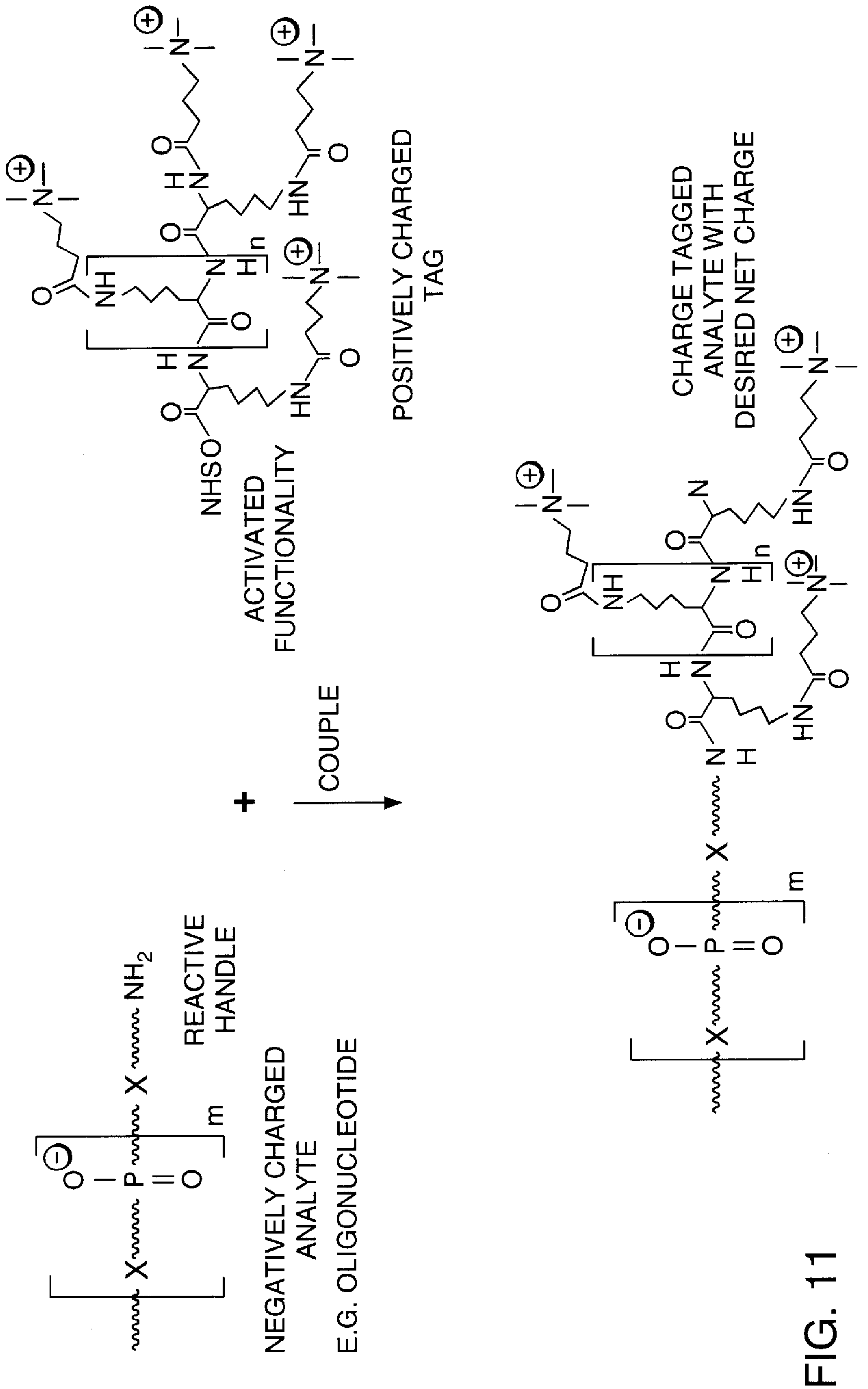
FIG. 11 shows another example of the coupling of a negatively charged analyte with a positively charged tag. The analyte has a reactive amine handle whereas the tag contains an activated NHS ester.

In another embodiment of this idea, the tag(s) is formed by reacting all of the primary and secondary amines of a poly(lysine) oligomer with the NHS ester of 3-carboxypropyltrimethylammonium chloride. The carboxy-terminus of the poly(lysine) oligomer-based tag is activated with NHS, and the tag(s) and analyte are coupled via the activated ester on the tag(s) and a reactive amine on the analyte (FIG. 11).

The tagged analyte molecules are then subjected to analysis by mass spectrometry to determine the mass of the tagged analyte or the fragmentation pattern of the tagged analyte. Various ionization methods or vaporization methods may be used to initially ionize or vaporize the tagged analyte. These methods include chemical ionization (CI), plasma and glow discharge ionization, electron impact ionization (EI), electrospray ionization (ESI), fast-atom bombardment (FAB), laser ionization (LIMS), and matrix-assisted laser desorption ionization (MALDI). Examples of spectrometric techniques include time-of-flight mass spectrometry, quadrapole mass spectrometry, magnetic sector mass spectrometry, and electric sector mass spectrometry. Examples of possible ionization/mass spectrometry (MS) combinations are as follows: ion-trap MS, electrospray ionization MS, ion-spray MS, liquid ionization MS, atmospheric pressure ionization MS, electron ionization MS, metastable atom bombardment ionization MS, fast atom bombardment ionization MS, MALDI MS, photo-ionization TOF MS, laser droplet MS, MALDI-TOF MS, ESI-TOF MS, APCI MS, nano-spray MS, nebulized spray ionization MS, chemical ionization MS, resonance ionization MS, secondary ionization MS, and thermospray MS.

Example 2

Creating Charges on the Tag After Attachment to the Analyte

The polyionic molecule (i.e., oligonucleotide) is attached to an uncharged tag which is later modified to produce the charged groups. The uncharged tag can be attached to the analyte by a variety of chemical methods including those described in Example 1 supra. The uncharged tag has a particular number of functional groups which can be later modified to create charged groups thereby resulting in a change in net charge on the tagged analyte. The tagged analyte with the newly created charges on the tag is then subjected to analysis by mass spectrometry. Any of the ionization techniques described supra could be used in the mass spectrometry step.

Figure 12:
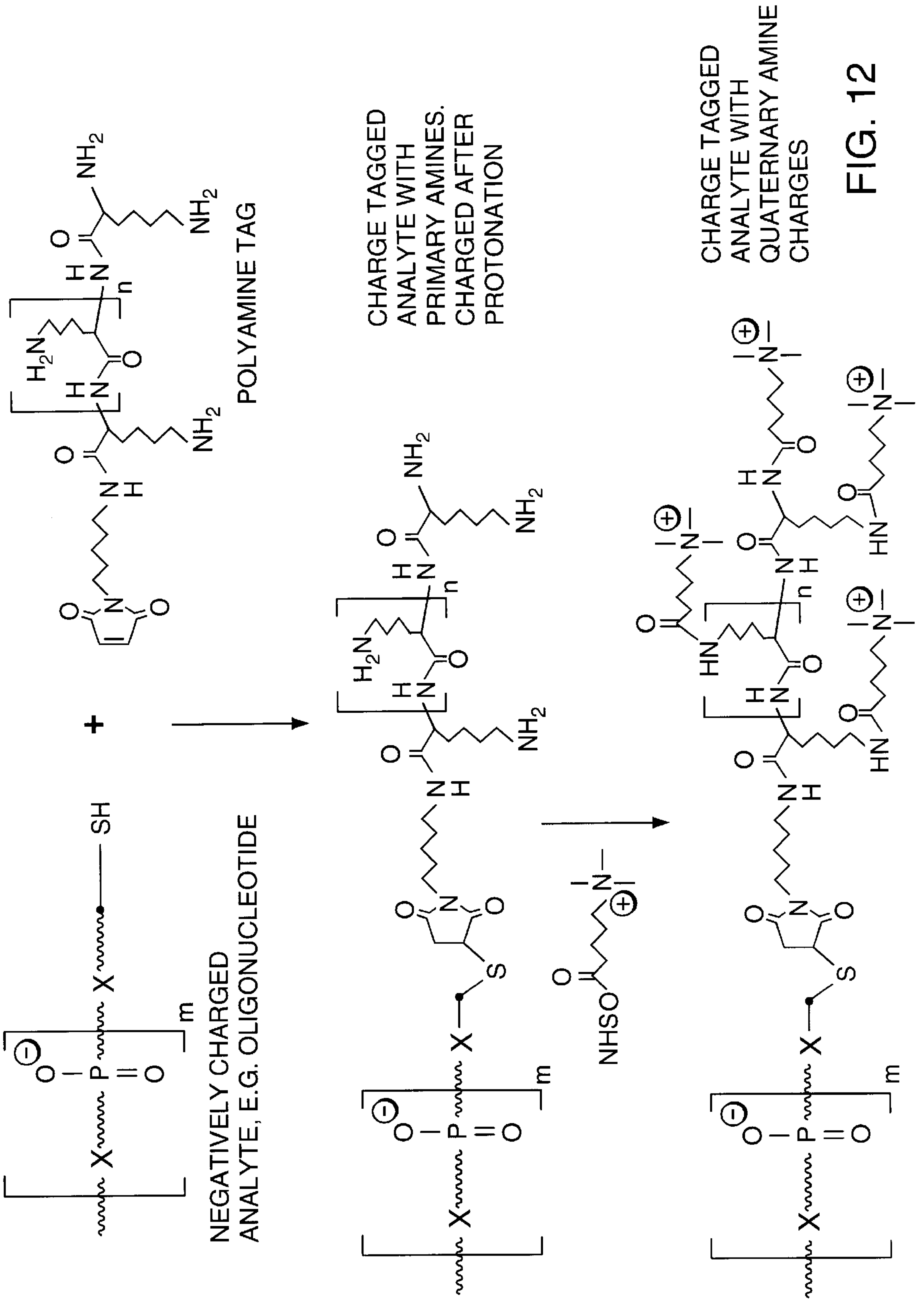
FIG. 12 shows the coupling of a polyionic analyte molecule to a poly(lysine) oligomer tag. The terminal amino groups of the lysine side chains are then coupled to quaternary amine-containing molecules.

In one embodiment, the polyionic molecule to be analyzed by mass spectrometry is attached to a poly(lysine) oligomer tag bearing no permanently charged groups (FIG. 12). The attachment is achieved using any of the compatible coupling reactions described in Example 1 supra, for example, coupling of a thiol with a maleimide. After attachment, the terminal amino groups of the poly(lysine) oligomer tag are reacted with another molecule having at least one positively charged group and an amine reactive functionality such as an activated ester. The adduct with the now charged tag is then analyzed by mass spectrometry.

Figure 13:
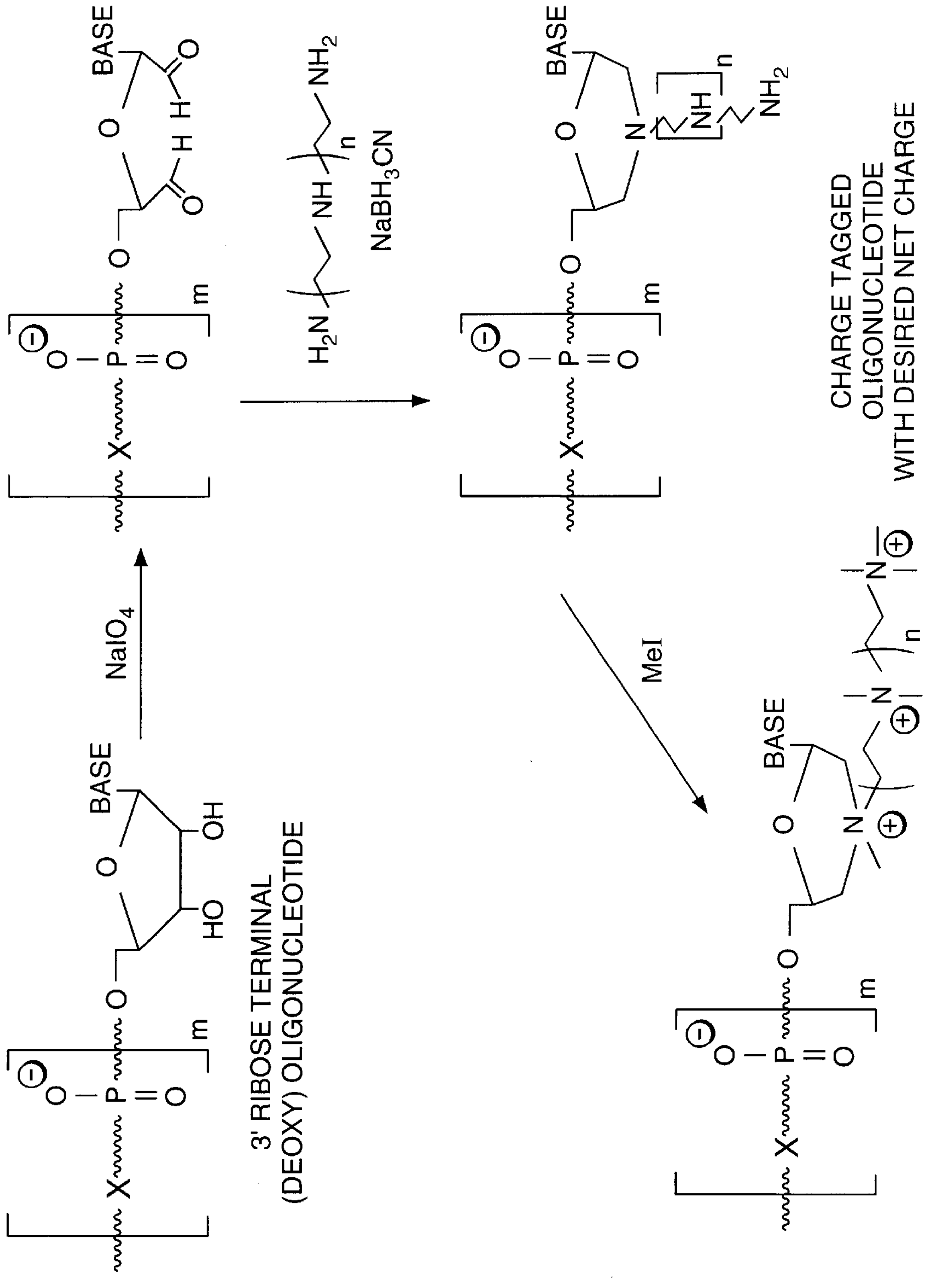
FIG. 13 depicts modification of the sugar moiety of an oligonucleotide in order to attach a polyamine tag. The polyamine tag is subsequently treated with methyl iodide to create positively charged quaternary ammonium groups.

In another embodiment, the ribose sugar of a monomer of the oligonucleotide is subjected to oxidative cleavage using periodic acid (FIG. 13). The selective oxidative cleavage of 1,2-diols can be accomplished in aqueous solution at pH 3 to 6 at 25° C. This results in cleavage of the 2'-C to 3'-C bond and the resulting formation of two aldehyde functionalities. The aldehydes are then reacted with a polyamine tag followed by sodium borohydride or cyanoborohydride to trap the intermediate imine. The initial amine product undergoes an intramolecular reaction and is reduced to form the cyclic amine. The amines of the tag are then alkylated using methyl iodide, dimethyl sulfate, or other reagent to yield the positively charged, quaternary ammonium groups. The molecule with the charged tag now attached is analyzed by mass spectrometry.

Example 3

Attaching Protected Tag to Analyte

Figure 14:
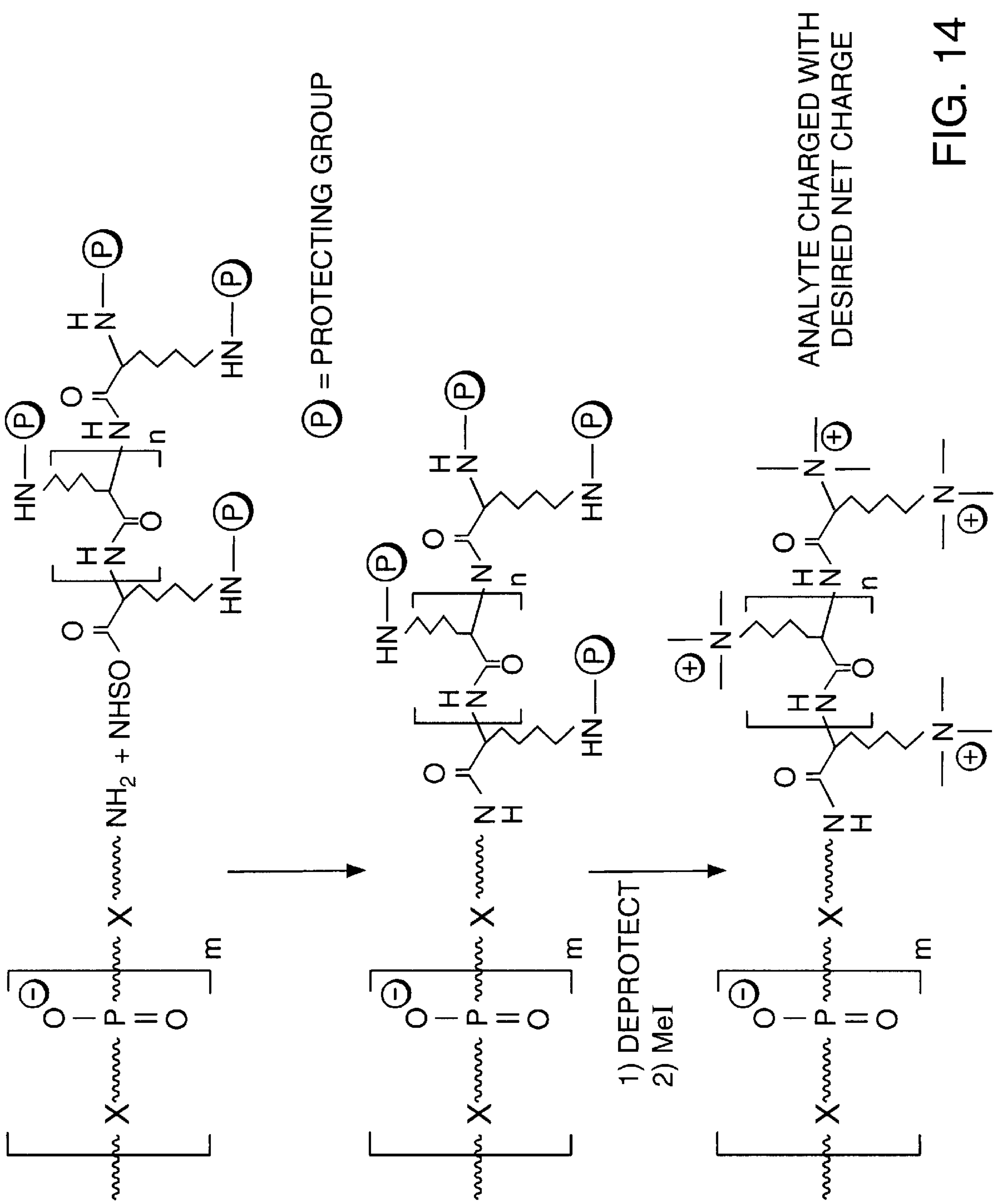
FIG. 14 shows coupling of the polyionic analyte molecule to a tag having protected amino groups. After coupling, the protecting groups are removed, and the amino groups are methylated with methyl iodide to form positively charged quaternary amine groups.

An analyte molecule is coupled to a tag such as a poly(lysine) oligomer which has its terminal amine groups protected. The poly(lysine) oligomer tag with protected amino groups is coupled to the analyte using any of the coupling reactions described in Example 1 supra. Typical amino protecting groups include benzyloxycarbonyl which can be removed using $H_2$/Pd, t-butoxycarbonyl which can be removed using trifluoroacetic acid (TFA), (9H-fluoren-9-ylmethoxy)carbonyl (finoc) which can be removed with piperidine, and trifluoroacetamide which can be removed with ammonia. After coupling, the amino groups of the tag are unprotected by treatment with the appropriate reagent as described above, and the anino groups are then reacted with an alkylating reagent such as methyl iodide or dimethyl sulfate to create positively charged quaternary ammonium groups (FIG. 14). The tagged molecule with the new net charge is then analyzed by mass spectrometry using any of the mass spectrometry methods listed in Example 1 supra.

Example 4

Tags Can Be Attached Anywhere

Figure 15:
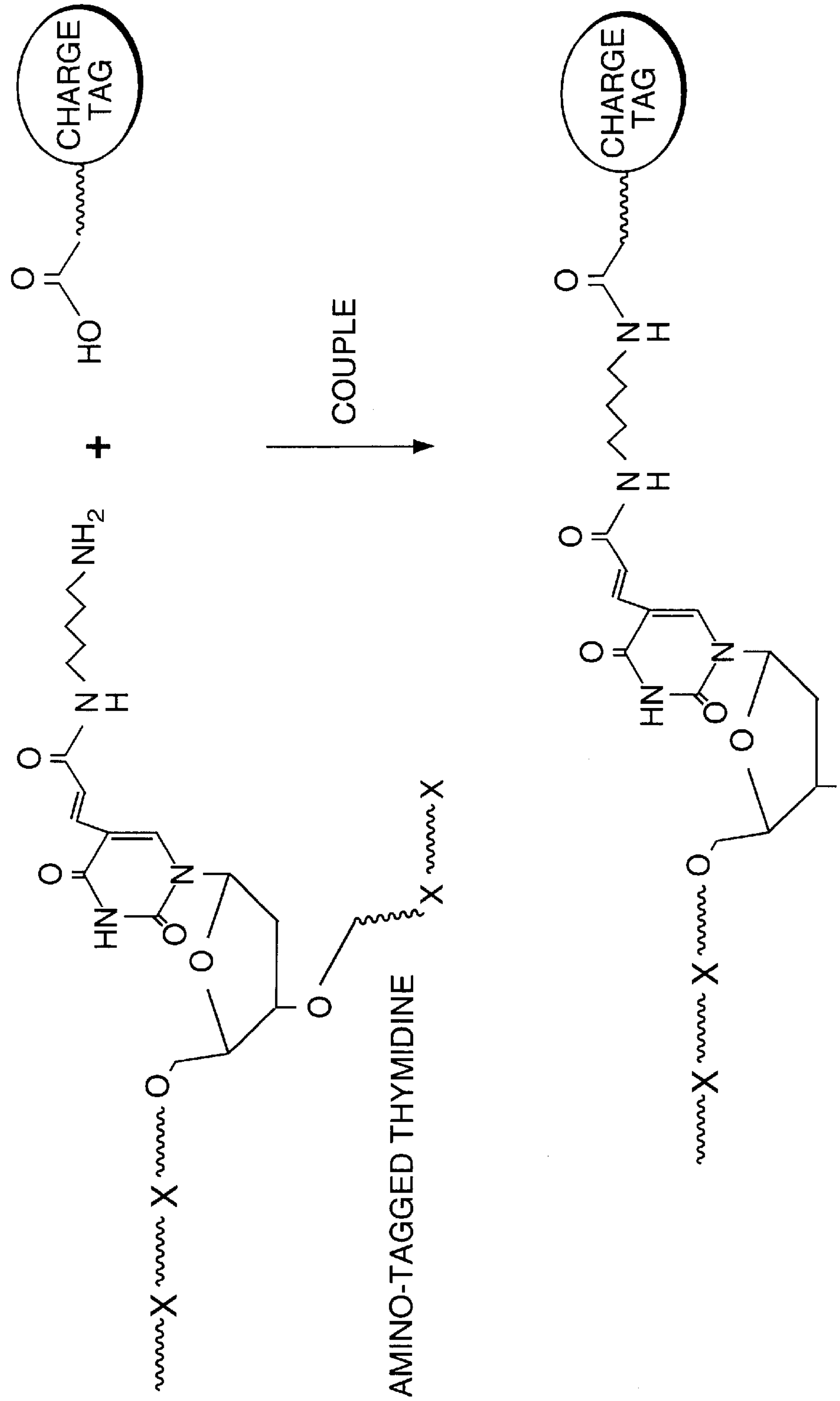
FIG. 15 shows attachment of the charged tag through a thymidine base in the oligonucleotide.

The tag can be attached to the oligonucleotide at the 5'-end, 3'-end, sugar moiety, phosphate linkage, or nucleotide base. This example describes the attachment of the tag to a thymidine base in the middle of the oligonucleotide (FIG. 15). The base of the thymidine residue is first modified by incorporating a linker to which will be attached the charged tag. The linker has a primary amino group to which can be coupled the tag. Any number of different tags can be attached to the linker provided the tag has an electrophilic group such as an ester, amide, aldehyde, alkyl halide, etc. (See Example 1). The tag may already have charged groups or may be modified later to create charged groups.

Example 5

Incorporation of the Tag during Oligonucleotide Synthesis

Figure 16:
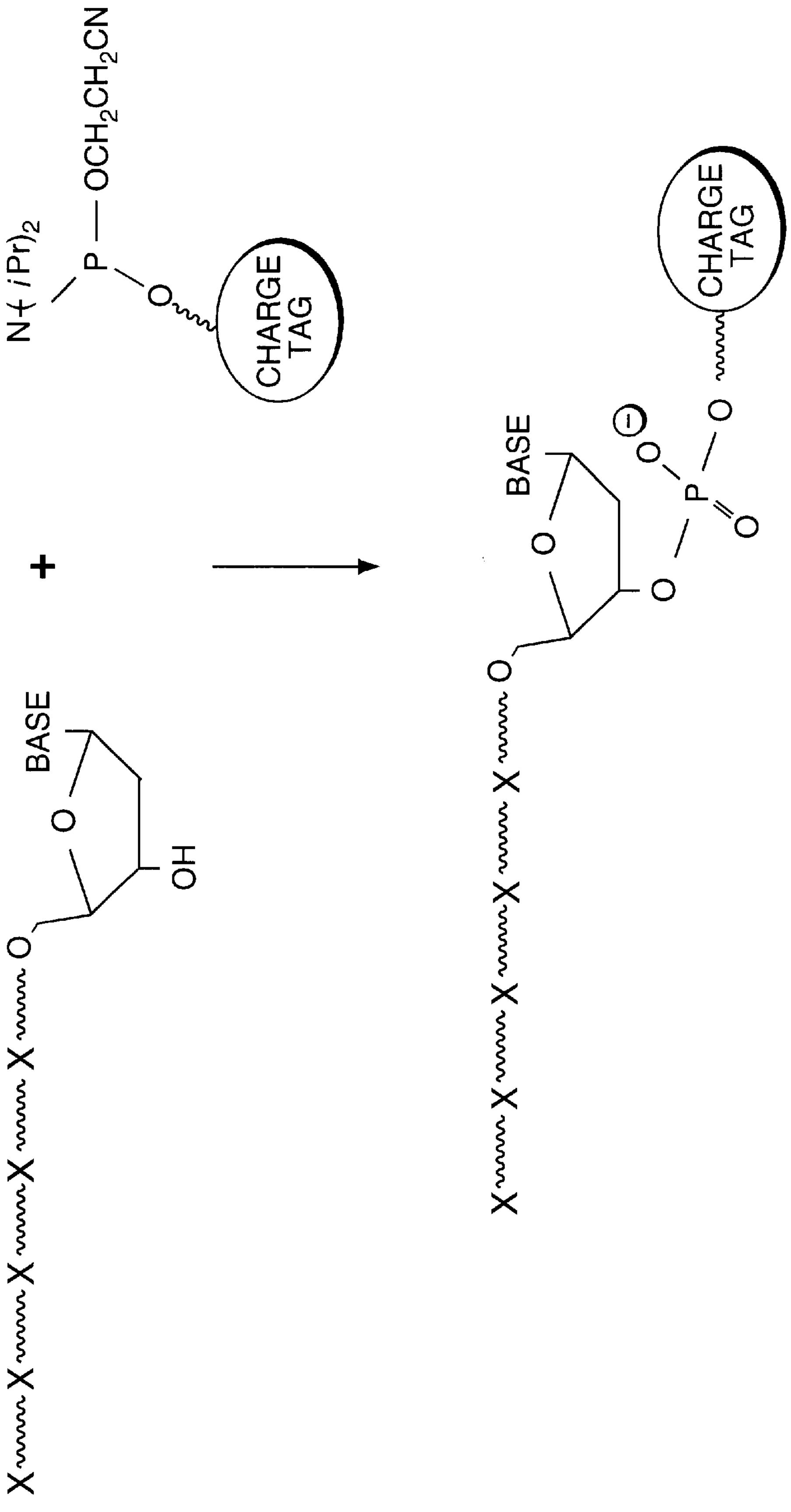
FIG. 16 shows incorporation of a tag during the solid phase synthesis of an oligonucleotide using a modified phosphoramidite.

The tag can also be incorporated into the oligonucleotide at the time of synthesis. A modified phosphoramidite with a charged tag is incorporated into the growing strand of the oligonucleotide (FIG. 16). After the synthesis of the oligonucleotide is complete, the charged tag is already in place, and the oligonucleotide along with the attached tag can be analyzed by mass spectrometry. Or the oligonucleotide may be extended in vivo or in vitro, and the extended product analyzed by mass spectrometry.

Example 6

Stepwise Incorporation of Tag(s) During Oligonucleotide Synthesis

Figures 17, 17A:
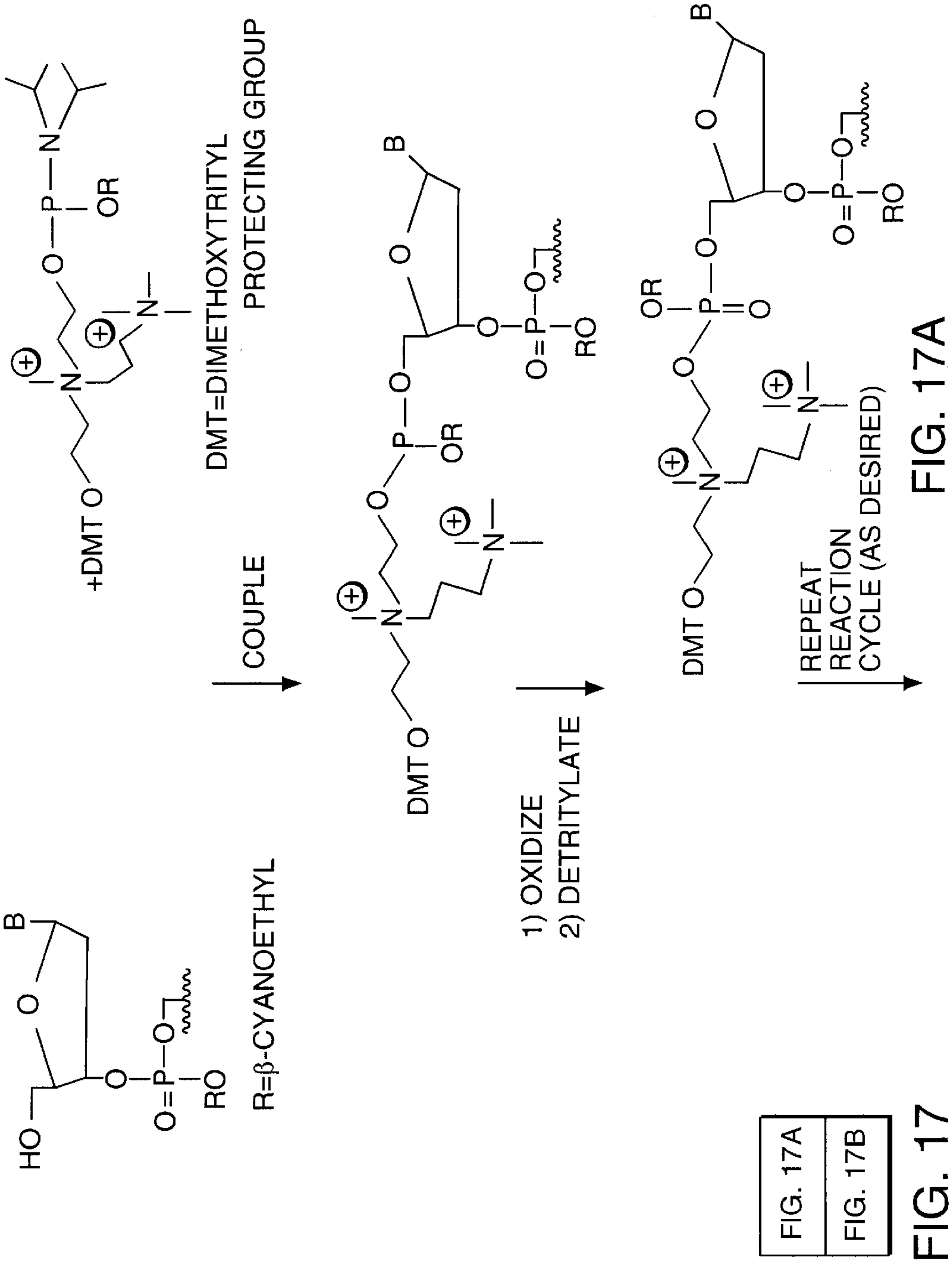
FIGS. 17A and 17B show the stepwise incorporation of tag(s) during the solid phase synthesis of an oligonucleotide using modified phosphoramidites. Each charged tag contains two positive charges.
Figure 17B:
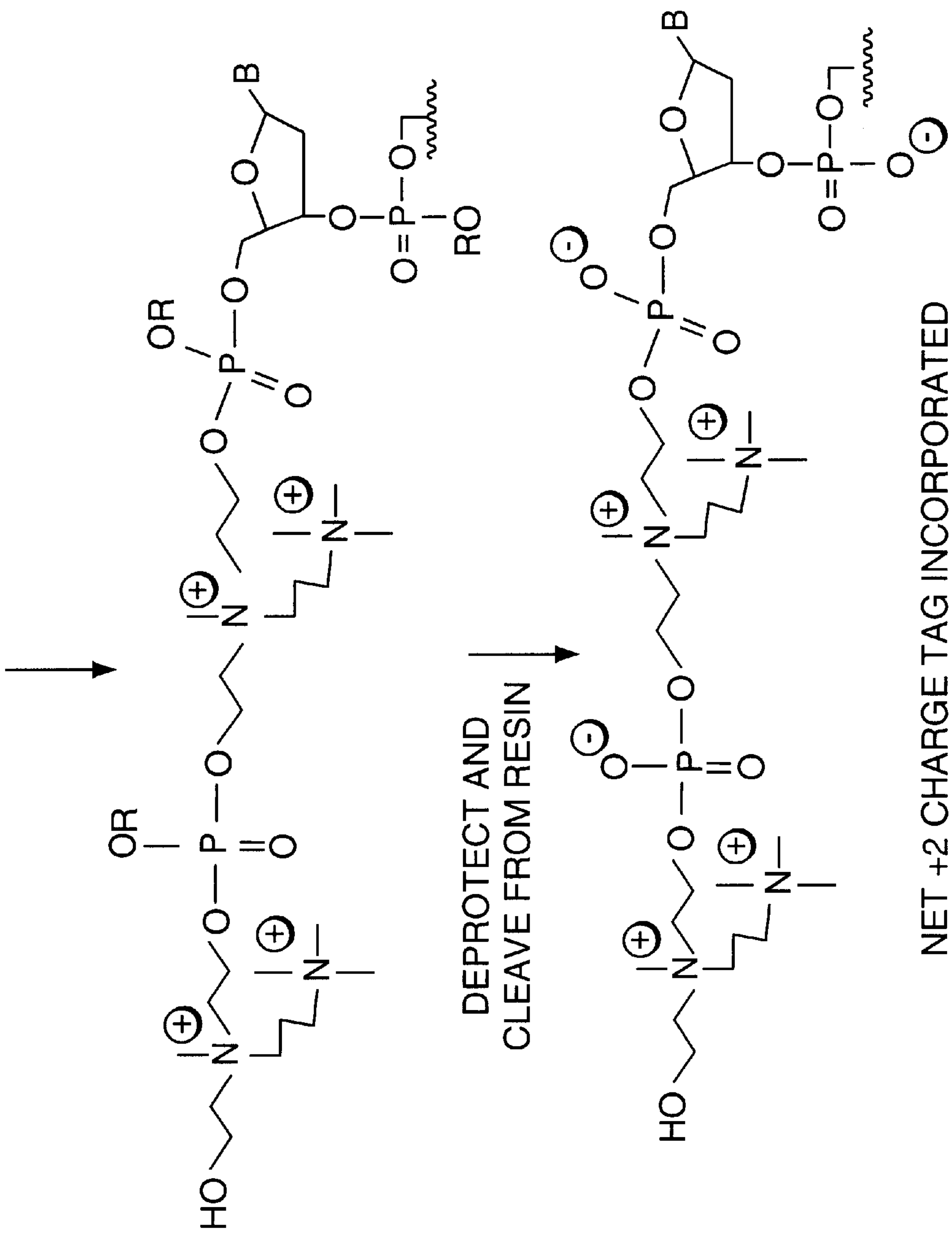
Figure 18:
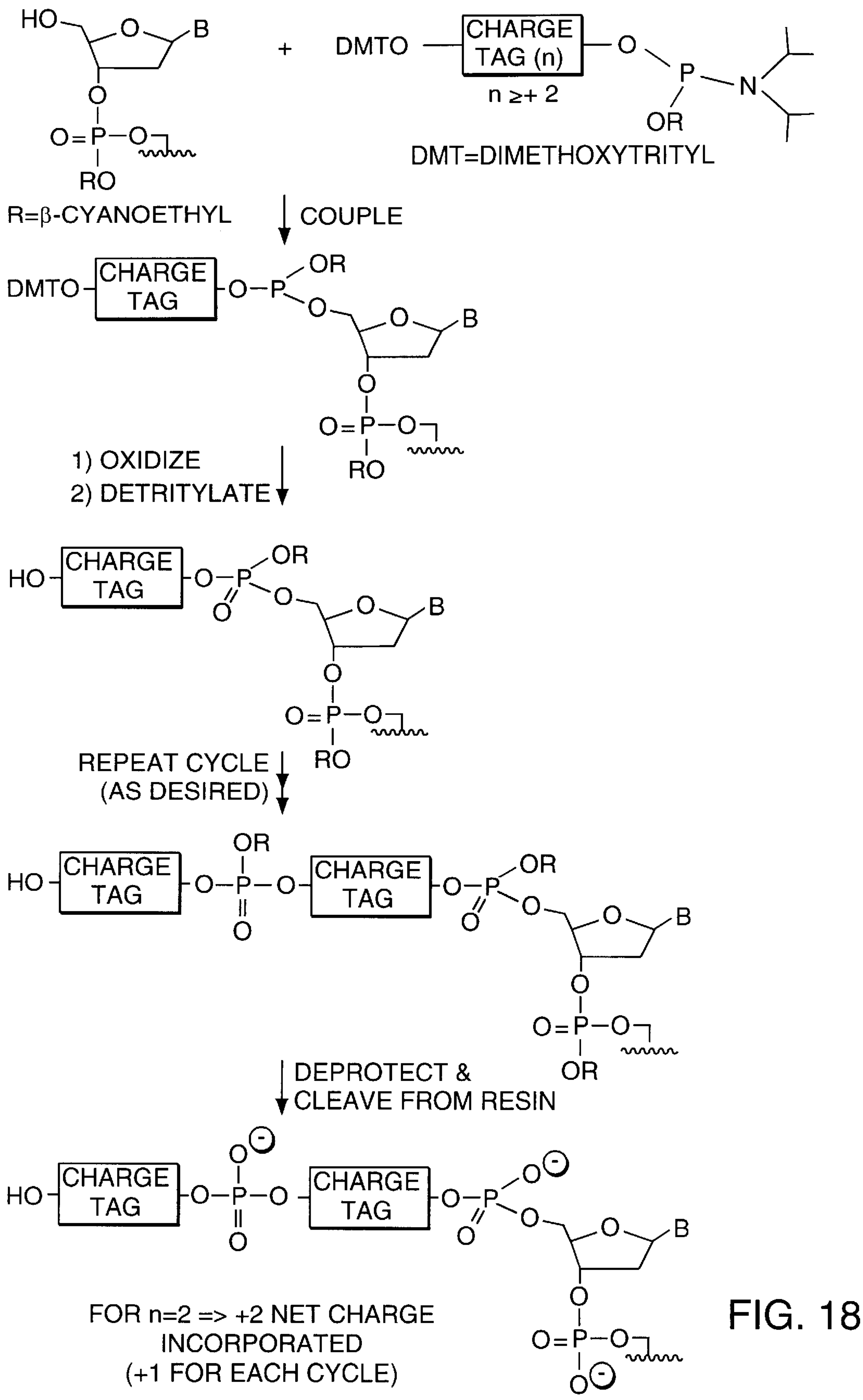
FIG. 18 shows a more generic example of the oligonucleotide synthesis shown in FIG. 17.

In this Example, tags containing charged groups are added during the solid phase synthesis of the oligonucleotide using standard techniques. The modified phosphoramidites as shown in FIGS. 17 and 18 are used. In FIG. 17, each phosphoramidite analog has two positively charged quaternary ammonium groups. These phosphoramidite analogs are added onto the oligonucleotide one at a time until the desired charge on the adduct is achieved. One advantage of this system is that the modified phosphoramidites have only two charges on them making them more amenable to standard solid phase synthetic techniques. However, since the modified phosporamidite only carries two positive charges and the phosphodiester linkage has one negative charge, only one net positive charge is added to the adduct with each addition of a phosphoramidite analog.

In another embodiment, the modified phosphoramidites have greater than two charged groups (FIG. 18). Fewer tags may then be needed to achieve the desired charge on the adduct.

After the synthesis of the oligonucleotide is complete and the oligonucleotide is deprotected and cleaved from the resin, the charged tag is already in place, and the oligonucleotide along with the attached tag can be analyzed by mass spectrometry. Or the oligonucleotide may be extended in vivo or in vitro, and the extended product analyzed by mass spectrometry.

Example 7

Synthesizing Charged Poly(Lysine) OligomerTag

The charged tag can be synthesized using standard solid phase peptide synthesis techniques. The modified lysine residue (trimethyl lysine) with the terminal amine group alkylated to form a quaternary ammonium group can be used in the synthesis of the tag. In this way, positive charges are added onto the tag one-by-one. Also, the trimethyl lysine groups can be interspersed with other amino acid residues. The resulting tags may be TriMeLys-Gly-TriMeLys-Gly-TriMeLys-Gly-(SEQ ID NO:4) . . . , TriMeLys-Ala-Ala-TriMeLys-Ala-Ala-TriMeLys-(SEQ 5) . . . , TriMeLys-Leu-TriMeLys-Val-TriMeLys-Gly-TriMeLys-(SEQ ID NO:6) . . . , etc (TriMeLys refers to trimethyl lysine). By placing intervening residues between the trimethyl lysine residues, the positive charges can be spaced apart.

The resulting charged tag can then be attached to the analyte molecule as described in the previous Examples.

Other Embodiments

The foregoing has been a description of certain non-limiting preferred embodiments of the invention. Those of ordinary skill in the art will appreciate that various changes and modifications to this description may be made without departing from the spirit or scope of the present invention, as defined in the following claims.

What is claimed is:

1. A method of analyzing a polyionic molecule by mass spectrometry, the method comprising steps of:

providing a polyionic molecule;

attaching at least one multiply charged tag to the polyionic molecule by a covalent linkage to produce a polyionic molecule/tag adduct, wherein the net charge on the adduct differs from that of the polyionic molecule; and analyzing the adduct by mass spectrometry.

2. A method of analyzing a collection of polyionic molecules by mass spectrometry, the method comprising steps of:

providing a collection of polyionic molecules, wherein the molecules have different charges;

attaching at least one multiply charged tag to each polyionic molecule by a covalent linkage to produce a collection of polyionic molecule/tag adducts, wherein the net charge on each adduct differs from that of each corresponding polyionic molecule; and analyzing the collection of adducts by mass spectrometry.

3. A method of claim 1 wherein the step of providing comprises incorporating the tag into the polyionic molecule during synthesis of the molecule.

4. A method of claim 1 wherein the polyionic molecule is a polynucleotide.

5. A method of claim 1 wherein the polyionic molecule is a protein.

6. A method of claim 1 wherein the tag is positively charged.

7. A method of claim 1 wherein the tag is negatively charged.

8. A method of claim 1 wherein the tag has both negatively and positively charged groups.

9. A method of claim 1 wherein the tag has at least one quaternary ammonium group.

10. The method of claim 1 wherein the tag has at least three charges.

11. A method of claim 1 wherein the step of modifying comprises attaching more than one tag.

12. A method of claim 1 wherein the step of modifying comprises attaching the tag to anywhere on the molecule.

13. A method of claim 2 wherein the step of attaching comprises attaching the same number of tags to each molecule.

14. A method of claim 1 wherein the net charge on the adduct is selected from the group consisting of +3, +2, +1, 0, −1, −2, or −3.

15. A method of claim 1 wherein the net charge on the adduct is a value other than +1 or −1.

16. A method of claim 1 wherein the net charge on the adduct is less than the net charge on the polyionic molecule.

17. A method of claim 2 wherein the step of attaching comprises reducing the net charge on at least one of the adducts to a value of 0.

18. The method of claim 1 wherein the tag has at least five charges.

19. The method of claim 1 wherein the tag has at least ten charges.

20. The method of claim 1 wherein the covalent linkage is an amide bond.

* * * * *

SEQUENCE LISTING

```
<160> NUMBER OF SEQ ID NOS: 6

<210> SEQ ID NO 1
<211> LENGTH: 4
<212> TYPE: PRT
<213> ORGANISM: Artificial Sequence

<400> SEQUENCE: 1

Lys Ala Lys Ala
  1


<210> SEQ ID NO 2
<211> LENGTH: 9
<212> TYPE: PRT
<213> ORGANISM: Artificial Sequence

<400> SEQUENCE: 2

Lys Gly Gly Gly Lys Gly Gly Gly Lys
  1               5


<210> SEQ ID NO 3
<211> LENGTH: 9
<212> TYPE: PRT
<213> ORGANISM: Artificial Sequence

<400> SEQUENCE: 3

Lys Ala Lys Ala Lys Leu Lys Val Lys
  1               5


<210> SEQ ID NO 4
<211> LENGTH: 6
<212> TYPE: PRT
<213> ORGANISM: Artificial Sequence
<220> FEATURE:
<221> NAME/KEY: VARIANT
<222> LOCATION: (1)
<223> OTHER INFORMATION: X = N-Trimethyl lysine
<220> FEATURE:
<221> NAME/KEY: VARIANT
<222> LOCATION: (3)
<223> OTHER INFORMATION: X = N-Trimethyl lysine
<220> FEATURE:
<221> NAME/KEY: VARIANT
<222> LOCATION: (5)
<223> OTHER INFORMATION: X = N-Trimethyl lysine

<400> SEQUENCE: 4

Xaa Gly Xaa Gly Xaa Gly
  1               5


<210> SEQ ID NO 5
<211> LENGTH: 7
```

-continued

```
<212> TYPE: PRT
<213> ORGANISM: Artificial Sequence
<220> FEATURE:
<221> NAME/KEY: VARIANT
<222> LOCATION: (1)
<223> OTHER INFORMATION: X = N-Trimethyl lysine
<220> FEATURE:
<221> NAME/KEY: VARIANT
<222> LOCATION: (4)
<223> OTHER INFORMATION: X = N-Trimethyl lysine
<220> FEATURE:
<221> NAME/KEY: VARIANT
<222> LOCATION: (7)
<223> OTHER INFORMATION: X = N-Trimethyl lysine

<400> SEQUENCE: 5

Xaa Ala Ala Xaa Ala Ala Xaa
  1             5


<210> SEQ ID NO 6
<211> LENGTH: 7
<212> TYPE: PRT
<213> ORGANISM: Artificial Sequence
<220> FEATURE:
<221> NAME/KEY: VARIANT
<222> LOCATION: (1)
<223> OTHER INFORMATION: X = N-Trimethyl lysine
<220> FEATURE:
<221> NAME/KEY: VARIANT
<222> LOCATION: (3)
<223> OTHER INFORMATION: X = N-Trimethyl lysine
<220> FEATURE:
<221> NAME/KEY: VARIANT
<222> LOCATION: (5)
<223> OTHER INFORMATION: X = N-Trimethyl lysine
<220> FEATURE:
<221> NAME/KEY: VARIANT
<222> LOCATION: (7)
<223> OTHER INFORMATION: X = N-Trimethyl lysine

<400> SEQUENCE: 6

Xaa Leu Xaa Val Xaa Gly Xaa
  1             5
```